(12) United States Patent  (10) Patent No.: US 7,305,040 B1
Yoshinari et al.  (45) Date of Patent: Dec. 4, 2007

(54) EDIT SYSTEM, EDIT CONTROL DEVICE, AND EDIT CONTROL METHOD

(75) Inventors: Hiromi Yoshinari, Kanagawa (JP); Yoshihiro Murakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/381,190

(22) PCT Filed: Jan. 19, 1999

(86) PCT No.: PCT/JP99/00151

§ 371 (c)(1),
(2), (4) Date: Nov. 23, 1999

(87) PCT Pub. No.: WO99/36912

PCT Pub. Date: Jul. 22, 1999

(30) Foreign Application Priority Data

Jan. 19, 1998 (JP) .................................. 10-007689
Jan. 19, 1998 (JP) .................................. 10-007690

(51) Int. Cl.
*H04L 27/00* (2006.01)
(52) U.S. Cl. ............... 375/259; 248/500; 248/423.1
(58) Field of Classification Search ............... 375/259, 375/316, 211, 340, 147; 348/500, 423.1
See application file for complete search history.

(56) References Cited

U.S. PATENT DOCUMENTS 5,265,122 A * 11/1993 Rasky et al. ................ 375/346
5,289,190 A    2/1994 Shimoda et al.
5,473,380 A   12/1995 Tahara
5,544,266 A    8/1996 Koppelmans et al.
5,715,009 A    2/1998 Tahara et al.
5,754,698 A    5/1998 Suzuki et al.
5,828,421 A * 10/1998 Boyce et al. ................ 348/565
5,929,898 A *  7/1999 Tanoi ....................... 348/14.09

(Continued)

FOREIGN PATENT DOCUMENTS

EP     0 781 039     6/1997

(Continued)

OTHER PUBLICATIONS

Brightwell et al.; "Flexible Switching and Editing of MPEG-2 Video Bitstreams" International Broadcasting Convention, London, GB, Sep. 12, 1997, pp. 547-552, XP002098561.

*Primary Examiner*—Kevin Burd
(74) *Attorney, Agent, or Firm*—Frommer Lawrence & Haug LLP; William S. Frommer; Thomas F. Presson

(57) ABSTRACT

A splicer/transcoder 21 interfaces with a material archiver/server using a stream. The splicer/transcoder 21 interfaces with an editor and switcher 22 using a base band signal. In a predetermined region including at least an edit point, a transcoding process is performed. In an input stream, two programs to be edited have been multiplexed. The editor and switcher 22 receives base band signals Sa and Sb of which respective programs have been encoded. As with a conventional editing device, the editor and switcher 22 edits the base band signals and returns the edited result as a base band signal Sc to the splicer/transcoder 21. The splicer/transcoder 21 re-encodes the base band signal Sc into an output stream using codec information obtained in the decoding process.

34 Claims, 19 Drawing Sheets

U.S. PATENT DOCUMENTS

| | | | |
|---|---|---|---|
| 5,940,130 A | 8/1999 | Nilsson et al. | |
| 5,991,276 A * | 11/1999 | Yamamoto | 370/260 |
| 5,991,313 A * | 11/1999 | Tanaka et al. | 370/537 |
| 6,038,256 A * | 3/2000 | Linzer et al. | 375/240.12 |
| 6,088,393 A | 7/2000 | Knee et al. | |
| 6,262,777 B1 * | 7/2001 | Brewer et al. | 348/515 |
| 6,567,471 B1 * | 5/2003 | Yoshinari | 375/240.26 |
| 7,139,316 B2 * | 11/2006 | Yoshinari | 375/240.25 |

FOREIGN PATENT DOCUMENTS

| | | |
|---|---|---|
| WO | WO 95 35628 | 12/1995 |
| WO | WO 95/35628 | * 12/1995 |

* cited by examiner

EDIT SYSTEM, EDIT CONTROL DEVICE, AND EDIT CONTROL METHOD

TECHNICAL FIELD

The present invention relates to an editing system, an editing controlling apparatus, and an editing controlling method that handle a bit stream.

BACKGROUND ART

With compressing technologies such as MPEG (Moving Picture Experts Group) system that have been recently used for digital broadcasts, many programs can be broadcast through a limited transmission medium (a wireless transmission medium or a wired transmission medium). Likewise, when a broadcast provider transmits programs, the rental fee of a transponder of a satellite circuit is expensive. Thus, from a view point of cost, it is effective to compress an occupied band-width. This situation is the same with a material transmission using a ground wave or a commercial wire circuit. Thus, when data is transmitted from a site to a broadcasting station or data is transmitted between broadcasting stations, it is meaningful to use an MPEG stream.

A major benefit for applying a compressing technology such as MPEG system to a picture material in a broadcasting station is to reduce the storage capacity of a picture material archiver/server. When a non-linear editing operation was not required, a picture material was archived on a tape whose running cost is low. However, since the non-linear editing operation has been required in recent years, it is necessary to reduce the storage capacity of a non-linear record medium (hard disk, DVD, or the like).

Next, with reference to FIG. 15, an outline of a transmission system corresponding to MPEG standard will be described. The transmission system has an encoder portion 110 and a decoder portion 120. The encoder portion 110 has a video data portion and an audio data portion. The video data portion comprises a video encoder 111 and a packetizer 112. The video encoder 111 encodes input video data $D_V$ and outputs a video elementary stream ES. The packetizer 112 packetizes the video elementary stream ES received from the video encoder 111, adds a header and so forth thereto, and outputs a video packetized elementary stream PES. The audio data portion of the encoder portion 110 comprises an audio encoder 113 and a packetizer 114. The audio encoder 113 encodes input audio data $D_A$ and outputs an audio elementary stream ES. The packetizer 114 packetizes the audio elementary stream ES received from the audio encoder 113, adds a header and so forth thereto, and outputs a video packetized elementary stream PES. The encoder portion 110 also has a multiplexer 115. The multiplexer 115 multiplexes the elementary streams received from the packetizers 112 and 114, generates transport stream packets (each of which is composed of 188 bytes), and outputs them as a transport stream TS.

The decoder portion 120 of the transmission system shown in FIG. 15 comprises a demultiplexer 121, depacketizers 122 and 124, a video decoder 123, and an audio decoder 125. The demultiplexer 121 demultiplexes the transport stream received through a transmission medium 116 into a video PES and an audio PES. The depacketizers 122 and 124 depacketize the video PES and the audio PES, respectively. The video decoder 123 decodes the video ES received from the depacketizer 122. The audio decoder 125 decodes the audio ES received from the depacketizer 124. The video decoder 123 outputs a base band video signal $D_V$. The audio decoder 125 outputs a base band audio signal $D_A$. The decoder portion 120 is referred to as IRD (Integrated Receiver/Decoder).

Concentrating on video data, the operation of the system shown in FIG. 15 will be described. In the encoder portion 110, the video encoder 111 encodes an input video data $D_V$ of which each picture has the same bit quantity, converts each picture to a bit quantity corresponding to its redundancy, and outputs the resultant data as a video elementary stream. The packetizer 112 absorbs (averages) the fluctuation of the bit quantity of the video elementary stream on the time base and outputs the resultant data as a video packetized elementary stream. The transport stream multiplexer 115 multiplexes the video packetized elementary stream received from the packetizer 112 and the audio packetized elementary stream received from the packetizer 114, generates the multiplexed data as transport stream packets, and supplies them as a transport stream TS to the decoder portion 120 through the transmission medium 116.

In the decoder portion 120, the transport stream demultiplexer 121 demultiplexes a transport stream into a video packetized elementary stream and an audio packetized elementary stream. The depacketizer 122 depacketizes the video packetized elementary stream and outputs the resultant data as a video elementary stream. The video decoder 123 decodes the video elementary stream and outputs the resultant data as video data $D_V$.

The decoder portion 120 performs a variable bit quantity extracting process for each reproduced picture from a received stream with a fixed bit rate using for example a 1.75 Mbit VBV (Video Buffering Verifier) buffer. Thus, the encoder portion 110 should control a generated bit quantity of each picture so as to prevent the VBV buffer from overflowing or underflowing. Such a controlling process is referred to as VBV buffer process.

As described above, from view points of effective use of limited transmission resources for a multi-channel broadcasting system and a reduction of the running-cost of a transmission circuit, it is very attractive to use an encoded stream. However, an MPEG stream corresponding to a highly efficient compressing system has restrictions against broadcast materials.

The compressing technology of the MPEG system has the following features: (1) In the MPEG system, an encoding process is performed corresponding to frame correlation of each GOP (Group Of Picture). (2) Each picture that has been encoded corresponding to the MPEG format has a variable bit length. (3) In MPEG2 format, the bit rate is controlled (a process of the VBV buffer) so that the buffer condition of the destination IRD is satisfied. (4) When an encoding process corresponding to the MPEG2 format is performed for transmitting data, the bit rate of the data is controlled corresponding to the capacity of a transmission path.

Due to the features of the MPEG system, when an MPEG bit stream is received and edited, the following problems will take place. In other words, when data is edited for each frame, after an MPEG stream is decoded to a base band signal, the data should be edited. Thereafter, the resultant base band signal should be encoded into an MPEG stream. Thus, whenever an editing operation including a switching operation is performed, the encoding process and the decoding process are repeated. Normally, when a decoding-encoding chain of a base band signal to an MPEG stream is performed, the resultant picture largely deteriorates. When an encoded bit stream is switched at any position, even if it is at the end of an encoding unit (in reality, even in a closed GOP structure that does not use the correlation of GOPs), the continuity of the buffer controlling operation is lost. Thus, the restrictions of the VBV buffer cannot be satisfied. As a result, a decoded picture freezes or breaks because the buffer overflows or underflow.

Due to such problems, it was said that it is substantially impossible to edit data as an MPEG stream. Thus, even if a compressed multi-channel broadcast corresponding to MPEG system is performed, a means for editing a base band material and finally encoding the edited data into an MPEG stream is used. When an original material is an MPEG stream, after the base band signal is decoded into a base band signal, it is edited by a conventional base band editing device. Thus, after the editing operation is performed, the resultant picture quality remarkably deteriorates. In addition, when a special effect such as gain adjustment is performed or when a logo of a broadcasting station is inserted, the MPEG stream cannot be used.

Next, such problems will be practically described with several examples of an editing system in a broadcasting station. FIG. 16 shows master servers and an interface of an editing studio. Each of the master servers has an MPEG stream archiver. In the broadcasting station, data is sent as a base band signal. In FIG. 16, reference numeral 101 is a master archiver/server in a broadcasting station. The archiver/server 101 is a non-linear archiver that has a storing portion. The storing portion stores a material of an MPEG compressed stream so as to reduce the data amount of the material. Both the archiver and the server store picture materials. However, the archiver is a device that dedicatedly stores a picture material. In contrast, the server outputs a picture material corresponding to a request received from an external device. According to the present invention, since both the archiver and the server have a function as a picture storing portion, the present invention can be applied to both the archiver and the server. Thus, in the specification, a term archiver/server is used.

The archiver/server 101 has an MPEG decoder that decodes an MPEG stream received from the storing portion. Base band video data S1 and S2 generated by an MPEG decoder are input to the editing studio 102. A transmission protocol of transmission paths in the broadcasting station is based on a base band signal. The editing studio 102 performs an editing operation for connecting the video data S1 and S2 (splice editing operation, AB roll operation, or the like). Video data S3 (a base band signal) that has been edited is input to the archiver/server 103. The archiver/server 103 has an MPEG encoder. The MPEG encoder supplies the edited result as an MPEG stream to a storing portion.

FIG. 17 shows an example of the structure of the editing studio 102. Since the data amount of video data of a base band signal is large (namely, the bit rate thereof is high), a tape medium is used as a record medium. In other words, video data S1 is recorded to a linear storage 104a. Video data S2 is recorded to a linear storage 104b. The linear storages 104a and 104b function as players. The video data Sa and Sb are supplied to an editor and switcher 105. Video data Sc as an edited result of the editor and switcher 105 is recorded to a linear storage 104c that functions as a recorder. The linear storage 104c outputs edited data as video data S3.

As shown in FIG. 18, the editing studio 102 may be composed of non-linear storages 106a, 106b, and 106c that use non-linear record mediums (hard disks, optical discs, and so forth). However, when a base band signal is handled with a non-linear record medium, since the data amount of the base band signal is large, the record medium is expensive. Thus, the structure of which a linear storage is disposed to each editing studio is not practical. In the editing system shown in FIG. 16, whenever an editing operation is performed, a decoding-encoding chain takes place. Thus, the picture quality of a material cumulatively deteriorates.

FIG. 19 shows master servers and an interface of an editing studio in the case that a transmission protocol of transmission paths in a broadcasting station is an MPEG stream. An archiver/server 131 and an archiver/server 133 store materials as MPEG streams. The archiver/server 131 outputs an MPEG stream to an editing studio 132. The archiver/server 131 receives an MPEG stream from the editing studio 132. Thus, the archiver/server 131 and the archiver/server 133 do not have an MPEG decoder and an MPEG encoder. With an MPEG stream, two or more picture materials can be multiplexed as streams TS1 and TS2. In such a multi-channel system, transmission paths can be effectively used. The streams TS1 and TS2 may be elementary streams or transport streams.

FIGS. 20 and 21 show a first example and a second example of the editing studio 132 of the system shown in FIG. 19, respectively. In the first example shown in FIG. 20, a stream TS1 is decoded into streams TS1a and TS1b. MPEG decoders 134a and 134b convert the streams TS1a and TS1b into respective base band signals. The resultant base band signals are stored to linear storages 135a and 135b. Base band video data Sa and Sb obtained by the linear storages 135a and 135b that function as players are supplied to a base band editor and switcher 136. The base band editor and switcher 136 supplies the edited result as video data Sc to a linear storage 135c that functions as a recorder. Video data received from the linear storage 135c is supplied to an MPEG encoder 134c. The MPEG encoder 134c outputs encoded data as an MPEG stream TS2.

In the second example of the editing studio 132 shown in FIG. 21, non-linear storages 137a, 137b, and 137c are used instead of the linear storages 135a, 135b, and 135c, respectively. In the example shown in FIG. 21, an MPEG stream can be sent through a transmission path of a broadcasting station so that a multi-channel system can be easily structured. However, in the first and second examples shown in FIGS. 20 and 21, whenever an editing operation is performed, a decoding-encoding chain takes place. Thus, the picture quality of the material unignorably deteriorates. In addition, the picture quality cumulatively deteriorates. Moreover, when a base band signal is handled with a non-linear record medium, since the data amount of the base band signal is large and the non-linear record medium is expensive, the second example shown in FIG. 21 of which a non-linear record medium is disposed in each broadcasting station is not practical.

To prevent a material from deteriorating against a decoding-encoding chain, a material is archived as a base band material. In this case, since the data amount of a picture material becomes large, it is difficult to store it to a non-linear record medium.

As a means for solving problems of material deterioration and record capacity, it is preferred to edit data as a stream. However, to do that, there are problems due to the features of the MPEG stream. To solve these problems, there are several methods. For a problem of overflow, the number of bits of each picture is counted. The VBV buffer is simulated so as to insert dummy data thereto. However, for a problem of underflow, no solving method is known. In this case, a picture freezes.

On the other hand, a bit rate controlling method is known. In this method, before an encoding process is performed, a switching point is designated so that a predetermined buffer amount takes place at the switching point. In this method, the problem of VBV buffer will be solved. However, the problem is solved at only the predetermined switching point. Thus, the scope of this method is limited.

In addition, to solve a problem of deterioration of picture quality due to a decoding-encoding chain, when a stream is decoded, information necessary for an encoding process and a decoding process is extracted and multiplexed with a base band signal. The information is referred to as codec information. When a re-encoding process is performed, with the codec information, the accuracy of reconstruction of a picture is improved. This process is referred to as trans codec process. The codes information contains information of moving vector, quantizing step, picture type, and so forth.

The information amount of codec information is not small. Thus, since the base band signal does not have a sufficient auxiliary region in which the codec information is multiplexed, the remaining codec information should be multiplexed with a valid picture region or transmitted through another line.

FIG. 22 shows an example of the structure of which an editing studio is structured with a transcoding process. The transcoding process is performed so as to prevent the picture quality of a material from cumulatively deteriorating against a decoding-encoding chain corresponding to each editing operation. In FIG. 22, codec information is sent through a path different from a material signal line. MPEG decoders 134a and 134b convert streams TS1a and TS1b into respective base band signals as base band video data Sa and Sb. The base band video data Sa and Sb are supplied to a base band editor and switcher 136. The base band editor and switcher 136 supplies the edited result as video data Sc to an MPEG encoder 134c. The MPEG encoder 134c re-encodes the video data Sc and outputs the re-encoded data as an MPEG stream TS2.

The editing studio shown in FIG. 22 also has information detectors 141a and 141b, signal lines 142a, 142b, and 142c, an information estimator 144, and a codec information adaptor 143. The information detectors 141a and 141b detect codec information used in the MPEG decoders 134a and 134b from streams or the decoders 134a and 134b, respectively. The signal lines 142a, 142b, and 142c transmit codec information. The information estimator 144 allows the encoder 134c to use the codec information. The codec information adaptor 143 organically connects the codec information with the edit information of the base band editor and switcher 136.

When codec information is sent through another line, the editor and switcher 136 performs an editing operation. To handle codec information sent through another system, a special structure such as the codec information adaptor 143 should be added. In other words, a conventional editing studio that handles a base band signal cannot be used.

FIG. 23 shows the structure of an editing studio that allows such a problem to be solved. In other words, in the structure shown in FIG. 23, codec information is multiplexed with a valid region of a base band signal. The editing studio shown in FIG. 23 has information detectors 141a and 141b that detect codec information from input streams TS1a and TS1b or decoders 134a and 134b, respectively. Imposers 145a and 145b multiplex the detected codec information with video data Sa and Sb as the base band signals, respectively. The multiplexed base band signals are supplied to a base band editor and switcher 136. As an example of the multiplexing method, codec information is randomly multiplexed as the least significant bit of each sample of video data.

The base band editor and switcher 136 outputs video data in which codec information has been multiplexed. The video data is supplied to a separator 146. The separator 146 separates codec information from the video data received from the base band editor and switcher 136. The video data Sc separated by the separator 146 is supplied to an MPEG encoder 134c. The MPEG encoder 134c re-encodes the video data Sc using the codec information received from the separator 146.

FIG. 24 shows the structure of which non-linear storages 147 and 148 are added to the structure shown in FIG. 23. The non-linear storage 147 outputs a stream that has been recorded and reproduced to MPEG decoders 134a and 134b. The non-linear storage 148 records a stream that is re-encoded by an MPEG encoder 134c.

As shown in FIGS. 23 and 24, when codec information is multiplexed with a base band signal and then the multiplexed signal is transmitted, the base band editor and switcher 136 does not need a special device such as a codec information adaptor. However, in the method of which codec information is inserted into a valid region of a picture signal, even if the codec information is converted into random data and then multiplexed with a picture signal, a picture distorts and the S/N ratio thereof deteriorates.

In the structures shown in FIGS. 23 and 24, when codec information is multiplexed with a base band signal, a multiplexing means is disposed in an editing studio. FIG. 25 shows an example of the structure of which a means for multiplexing and demultiplexing codec information is disposed in an archiver/server. Referring to FIG. 25, a archiver/server 151 comprises MPEG decoders 155a and 156a, information detectors 155b and 156b, and imposers 157a and 157b. The MPEG decoders 155a and 156a decode an MPEG stream received from a storing portion 154. The information detectors 155b and 156b detect codec information from respective streams. The imposers 157a and 157b multiplex codec information with video data as base band signals.

Video data S11 and S12 in which codec information has been multiplexed are supplied to an editing studio 152. The editing studio 152 handles a base band signal. As with the structure shown in FIG. 24, the editing studio 152 is composed of a linear storage and a base band editor and switcher.

Video data S13 as a base band signal in which codec information received from the editing studio 152 has been multiplexed is supplied to an archiver/server 153 that stores video data as an edited result. A separator 158 separates codec information from the video data S13. An MPEG encoder 159 re-encodes the resultant video data using the codec information. A stream received from the MPEG encoder 159 is stored to a storing portion 160. However, actually, the structure shown in FIG. 25 does not correctly function. In other words, connections in the structure shown in FIG. 25 are invalid. In the editing studio 152, video data is recorded to a conventional record medium such as a VTR (Video Tape Recorder) that records a base band signal. Of course, the conventional VTR does not support a function for extracting codec information and supplying the extracted codec information to the next stage. Moreover, since most conventional digital VTRs use a compressing system other than the MPEG system, information multiplexed in a valid region of a signal is compressed and decompressed in the same manner as video data. Thus, since codec information is compressed and decompressed, the resultant video data distorts. Consequently, the codec information cannot be used. Even if codec information is superimposed at the least significant bit of video data, the least significant bit is varied by the compressing process and the decompressing process of the VTR.

On the other hand, in the structures shown in FIGS. 23 and 24, a stream is transmitted. Additional structural elements such as an MPEG decoder and a re-encoder are disposed in an editing studio. Thus, a probability for interfacing a conventional VTR with a base band signal in which codec information has been multiplexed is excluded. However, as described above, when codec information is inserted into a valid region of a picture signal, the resultant picture distorts and the S/N ration thereof deteriorates.

Therefore, an object of the present invention is to provide an editing system, an editing controlling apparatus, and an editing controlling method that allow a storage medium and a transmission medium to be effectively used, the picture quality to be suppressed from deteriorating, and a conventional base band editing device to be used.

Another object of the present invention is to provide an editing system, an editing controlling apparatus, and an editing controlling method that allow an edit position to be detected without need to obtaining edit position information from an editing device.

A further object of the present invention is to provide an editing system, an editing controlling apparatus, and an editing controlling method that allow codec information for a re-encoding process to be used in a unit smaller than a picture and the picture quality of a re-encoded picture to be prevented from deteriorating.

DISCLOSURE OF THE INVENTION

Claim 1 of the present invention is directed to an editing system having an editing device for editing a base band signal and an editing controlling device connected to the editing device. The editing controlling device comprises a first decoding means for decoding a first encoded bit stream of which a material has been encoded and outputting a first base band signal, and a second decoding means for decoding a second encoded bit stream of which a material has been encoded and outputting a second base band signal to the editing device. An encoding means is also provided for re-encoding a third base band signal as an edited result of the first base band signal and the second base band signal received from the editing device with codec information used in the first decoding means and the second decoding means and outputting a third encoded bit stream. A controlling means for selecting codec information used by the first encoding means and the second encoding means corresponding to edit position information received from an external device is also provided.

Claim 8 of the present invention is directed to an editing controlling apparatus. The apparatus comprises a first decoding means for decoding a first encoded bit stream of which a material has been encoded and outputting a first base band signal, and a second decoding means for decoding a second encoded bit stream of which a material has been encoded and outputting a second base band signal to an editing device. The apparatus also includes an encoding means for re-encoding a third base band signal as an edited result of the first base band signal and the second base band signal received from the editing device with codec information used in the first decoding means and the second decoding means and outputting a third encoded bit stream. A controlling means is also provided for selecting codec information used by the first encoding means and the second encoding means corresponding to edit position information received from an external device.

Claim 15 of the present invention is directed to an editing controlling method. The method comprises the steps of inputting a first encoded bit stream of which a first material has been encoded and a second encoded bit stream of which a second material has been encoded, and sending to an editing device a first base band signal and a second base band signal of which the first encoded bit stream and the second encoded bit stream have been decoded respectively. The method further comprises the steps of receiving a third base band signal as an edited result of the first base band signal and the second base band signal from the editing device, selecting required codec information of codec information used for decoding the first encoded bit stream and the second encoded bit stream corresponding to edit position information received from an external device, and re-encoding the third base band signal with the selected coded information and outputting a third encoded bit stream.

Claim 16 of the present invention is directed to an editing controlling apparatus having an editing device for editing a base band signal and an editing controlling device connected to the editing device. The editing controlling device comprises a first decoding means for decoding a first encoded bit stream of which a material has been encoded and outputting a first base band signal, and a second decoding means for decoding a second encoded bit stream of which a material has been encoded and outputting a second base band signal to the editing device. The editing controlling device further comprises a comparing means for comparing the first base band signal, the second base band signal, and the third base band signal in the state that the phases thereof match so as to detect an edit position, a controlling means for selecting codec information used in a re-encoding process corresponding to information of the edit position, and an encoding means for re-encoding the third base signal as an edited result of the first base band signal and the second base band signal received from the editing device using the selected codec information and outputting a third encoded bit stream.

Claim 19 of the present invention is directed to an editing controlling apparatus. The editing apparatus comprises a first decoding means for decoding a first encoded bit stream of which a material has been encoded and outputting a first base band signal, and a second decoding means for decoding a second encoded bit stream of which a material has been encoded and outputting a second base band signal to an editing device. The editing controlling apparatus further comprises a comparing means for comparing the first base band signal, the second base band signal, and the third base band signal in the state that the phases thereof match so as to detect an edit position, a controlling means for selecting codec information used in a re-encoding process corresponding to information of the edit position, and an encoding means for re-encoding the third base signal as an edited result of the first base band signal and the second base band signal received from the editing device using the selected codec information and outputting a third encoded bit stream.

Claim 22 of the present invention is directed to an editing controlling method. The method comprises the steps of inputting a first encoded bit stream of which a first material has been encoded and a second encoded bit stream of which a second material has been encoded, and sending to an editing device a first base band signal and a second base band signal of which the first encoded bit stream and the second encoded bit stream have been decoded respectively. The method further comprises the steps of storing the first base band signal, the second base band signal, and codec information used in the decoding process of the first base band signal and the second base band signal, receiving a third base band signal as an edited result of the first base band signal and the second base band signal from the editing device, and comparing the first base band signal with the third base band signal in the state that the phases of the first base band signal and the third base band signal match and comparing the second base band signal with the third base band signal in the state that the phases of the second base band band signal and the third base band signal match so as to detect an edit position. The method finally comprises the steps of selecting codec information used in the re-encoding process of the third base band signal corresponding to the detected edit position, and re-encoding the third base band signal with the selected coded information and outputting a third encoded bit stream.

According to the present invention, since the input/output signal format of the editing controlling is an encoded bit stream, encoded data of a plurality of picture materials can be easily multiplexed. Thus, a transmission medium can be effectively used. In addition, the editing controlling apparatus interfaces with the editing device using a base band signal. Moreover, codec information is not multiplexed with a base band signal. In addition, it is not necessary to transmit codec information used for a transcoding process through another signal line. Thus, the number of signal lines can be prevented from increasing. Consequently, the conventional base band editing apparatus can be directly used as an editing device.

In addition, since a first base band signal and a second base band signal that are output to the editing device are compared with a third base band signal received from the editing device in the state that the phases thereof match, an edit position can be detected. Thus, a line for transmitting edit position information to the editing device can be omitted. Moreover, it is not necessary to interpret edit position information into time base information of a stream.

In addition, the validity of the use of codec information for a re-encoding process can be determined for each block as well as each picture. Thus, even if two original materials co-exists in a picture at an edit point, the deterioration of the picture quality against a re-encoding process can be suppressed.

BEST MODES FOR CARRYING OUT THE INVENTION

Figure 1:
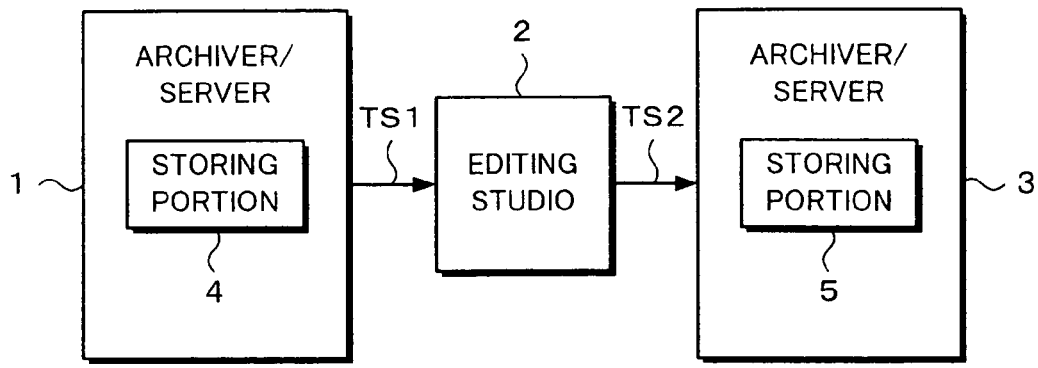
FIG. 1 is a block diagram showing the overall system structure of a broadcasting station according to a first embodiment of the present invention.

Next, with reference to the accompanying drawings, an embodiment of the present invention will be described. FIG. 1 shows the structure of an editing system according to the present invention. An archiver/server 1 and an archiver/server 3 have storing portions 4 and 5, respectively. The storing portions 4 and 5 store picture materials of encoded bit streams for example MPEG streams. Since MPEG streams have been compressed corresponding to MPEG format, non-linear record mediums can be used as the storing portions 4 and 5. Both the archiver and the server store picture materials. However, the archiver is a device that dedicatedly stores a picture material. In contrast, the server outputs a picture material corresponding to a request received from an external device. According to the present invention, since both the archiver and the server have a function as a picture storing portion, the present invention can be applied to both the archiver and the server. Thus, in the specification, a term archiver/server is used.

In transmission paths from the archiver/server 1 to the editing studio 2 to the archiver/server 3, encoded bit streams (for example, MPEG streams) are transmitted. Thus, since a plurality channels are multiplexed, transmission resources can be effectively used. In other words, in a stream TS1 transmitted from the archiver/server 1, two or more original video/audio materials are multiplexed. A stream TS2 is a stream as an edited result. However, when necessary, an edited result and two or more video/audio materials can be multiplexed. In this example, the streams TS1 and TS2 are transport streams. Alternatively, the streams TS1 and TS2 may be packetized elementary streams.

Figure 2:
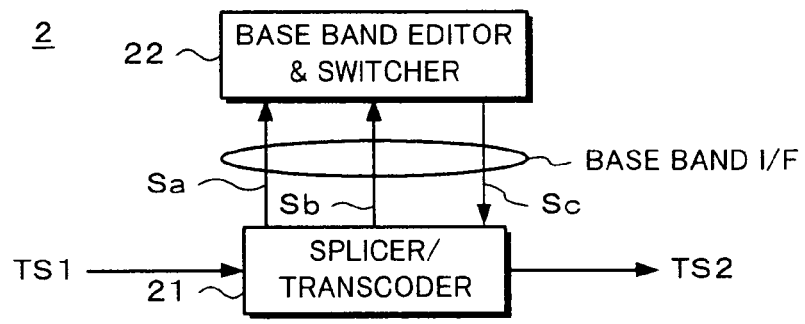
FIG. 2 is a block diagram showing an example of an editing studio according to the first embodiment of the present invention.
Figure 3:
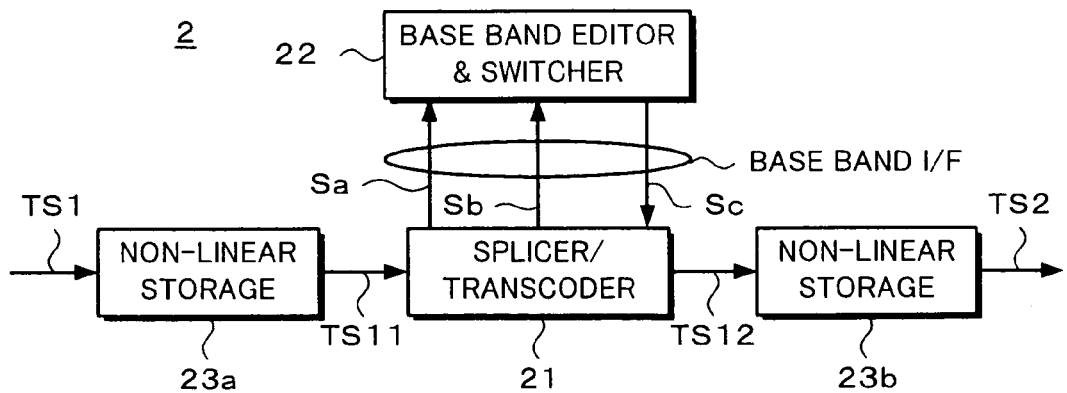
FIG. 3 is a block diagram showing another example of the editing studio according to the first embodiment of the present invention.

The editing studio 2 is structured as shown in FIG. 2 or FIG. 3. In an example shown in FIG. 2, the editing studio 2 has a splicer/transcoder 21 and a base band editor and switcher 22. The splicer/transcoder 21 inputs a stream TS1 and outputs a stream TS2. The base band editor and switcher 22 inputs video data Sa and Sb as base band signals and outputs video data Sc so as to interface with the splicer/transcoder 21 using base band signals. The splicer/transcoder 21 functions as an editing controlling apparatus. The base band editor and switcher 22 functions as an editing device.

The splicer/transcoder 21 is basically a transcoder that performs a decoding process for converting an input stream into a base band signal that is output to the editor and switcher 22 and a re-encoding process for converting a base band signal received from the editor and switcher 22 into an output stream. As will be described later, the transcoding process may be performed in a predetermined region including an edit point. An input stream or an output signal of the transcoding process may be switched. In other words, the splicer/transcoder 21 may function as a splicer. Thus, in the example, the term "splicer/transcoder" is used.

In another example of the editing studio shown in FIG. 3, non-linear storages 23*a* and 23*b* are added to the structure shown in FIG. 2. The non-linear storage 23*a* records a stream TS1 received from an archiver/server 1 and supplies a stream TS11 to a splicer/transcoder 21. The non-linear storage 23*b* records a stream TS12 received from the splicer/transcoder 21 and outputs a stream TS2.

As are clear from FIGS. 2 and 3, the input/output signals of the splicer/transcoder 21 are MPEG streams. Thus, since multiple channels are easily multiplexed, transmission resources can be effectively used. In addition, the base band editor and switcher 22 can interface with the splicer/transcoder 21 using base band signals.

In addition, since the splicer/transcoder 21 performs a transcoding process, it does not need to output codec information necessary for an re-encoding process to the editor and switcher 22. Thus, with a conventional base band signal editing device as the base band editor and switcher 22, an editing system can be structured.

Moreover, the splicer/transcoder 21 correlates an MPEG picture (including codec information) of an input stream ST1 with a frame (or a field) of a base band input/output signal. When the editor and switch 22 requires time code information is required, it is sent from the splicer/transcoder 21 to the editor and switcher 22 through a bidirectional signal line connected therebetween. The time code information corresponds to the relation between an MPEG picture and a time code defined in the splicer/transcoder 21. In other words, time management information of an MPEG picture used in the splicer/transcoder 21 just corresponds to time management information (time code) used in the editing operation of the editor and switcher 22.

The return time of the edited base band signal Sc from the base band editor and switcher 22 is obtained by adding the output time of the base band signal Sc and the system delay of the base band editor and switcher 22. Codec information necessary for a re-encoding process can be easily correlated with a frame of a return base band signal Sc by recording the output time of the base band signal of the splicer/transcoder 21.

In addition, the splicer/transcoder 21 receives edit position information such as cue information as a conventional time code from the base band editor and switcher 22 or a host CPU (or a control machine) that controls the base band editor and switcher 22 and correlates the edit position information with an MPEG picture. In other words, the splicer/transcoder 21 detects an edit frame corresponding to cue information and selects codec information used in a re-encoding process. The codec information contains for example moving vector, picture type, quantizing step size, and quantizing scale.

To correlate a time code with an MPEG picture, a correlation table that represents the relation between a PTS (Presentation Time Stamp) of any material and a time code is inserted into for example an input stream. The correlation table may be transmitted in various manners. For example, the correlation table may be transmitted as a section type independent packet. Alternatively, the correlation table may be placed in a user area such as an extension of the stream syntax.

As another alternative method, a time code correlating with an MPEG picture may be inserted into a stream and the resultant stream may be transmitted. In this case, the correlation table is not required. The transmission time information is not limited to a time code. During an editing operation, a picture index just corresponding to a time code may be transmitted in a sufficient time designation range. Moreover, with information such as PTS, picture type, GOP, and repeat first field corresponding to pull down operation and field flip operation as a syntax of an MPEG stream (rules of an encoded data stream), a time code can be correlated with cue information.

Figure 4:
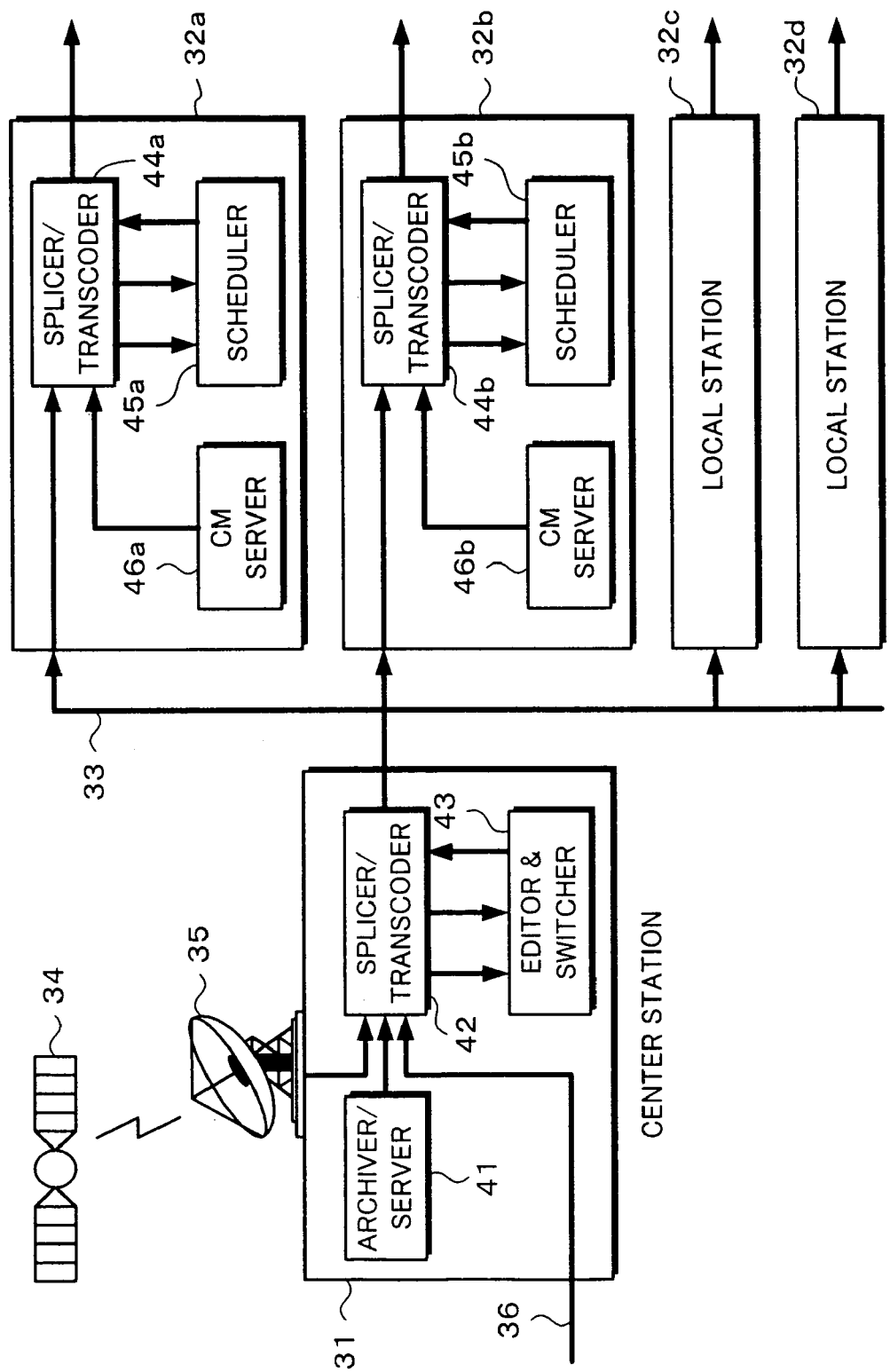
FIG. 4 is a block diagram showing an example of a broadcasting network according to the present invention.

FIG. 4 shows an outline of the structure of a broadcasting system according to the present invention. Referring to FIG. 4, a center station 31 is connected to a plurality of local stations 32*a*, 32*b*, 32*c*, 32*d*, . . . through a transmission network 33. An MPEG bit stream is transmitted through the transmission network. With an MPEG bit stream, many channels can be multiplexed and transmitted. The center station 31 has an antenna 35 that receives a radio wave from a communication/broadcasting satellite 34. A program material received by the antenna 35, a live material received from a site through a microwave circuit 36, and a program material and a CM material received from an archiver/server 41 in the center station 31 are supplied as MPEG streams to a splicer/transcoder 42.

As described above, the splicer/transcoder 42 has a base band interface with a base band editor and switcher 43. The splicer/transcoder 42 selects input program materials and generates a broadcast program (as an MPEG bit stream). The center station 31 transmits the broadcast program to the local stations 32*a*, 32*b*, . . . through the network 33.

In the local station 32*a*, an MPEG stream received from the center station 31 and a CM (Commercial Message) material received from a CM server 46*a* are input to a splicer/transcoder 44*a*. The splicer/transcoder 44*a* and a CM insertion scheduler 45*a* are connected with a base band interface. The CM server 46*a* stores CM materials created by the local station 32*a*. The CM insertion scheduler 45*a* substitutes a CM contained in a program bit stream received from the center station 31 with a local CM of the local station 32a. With the transcoding process, a local CM can be substituted almost free of deterioration. Likewise, in other local stations 32b, 32c, . . . , their local CMs can be substituted.

In addition to the substitution of a local CM, the center station 31 and the local stations 32a, 32b, . . . can insert their logos into program bit streams. Moreover, along with ground wave broadcasts, the present invention can be applied to the relation between a cable operator and head end stations of a CATV system.

Figure 5:
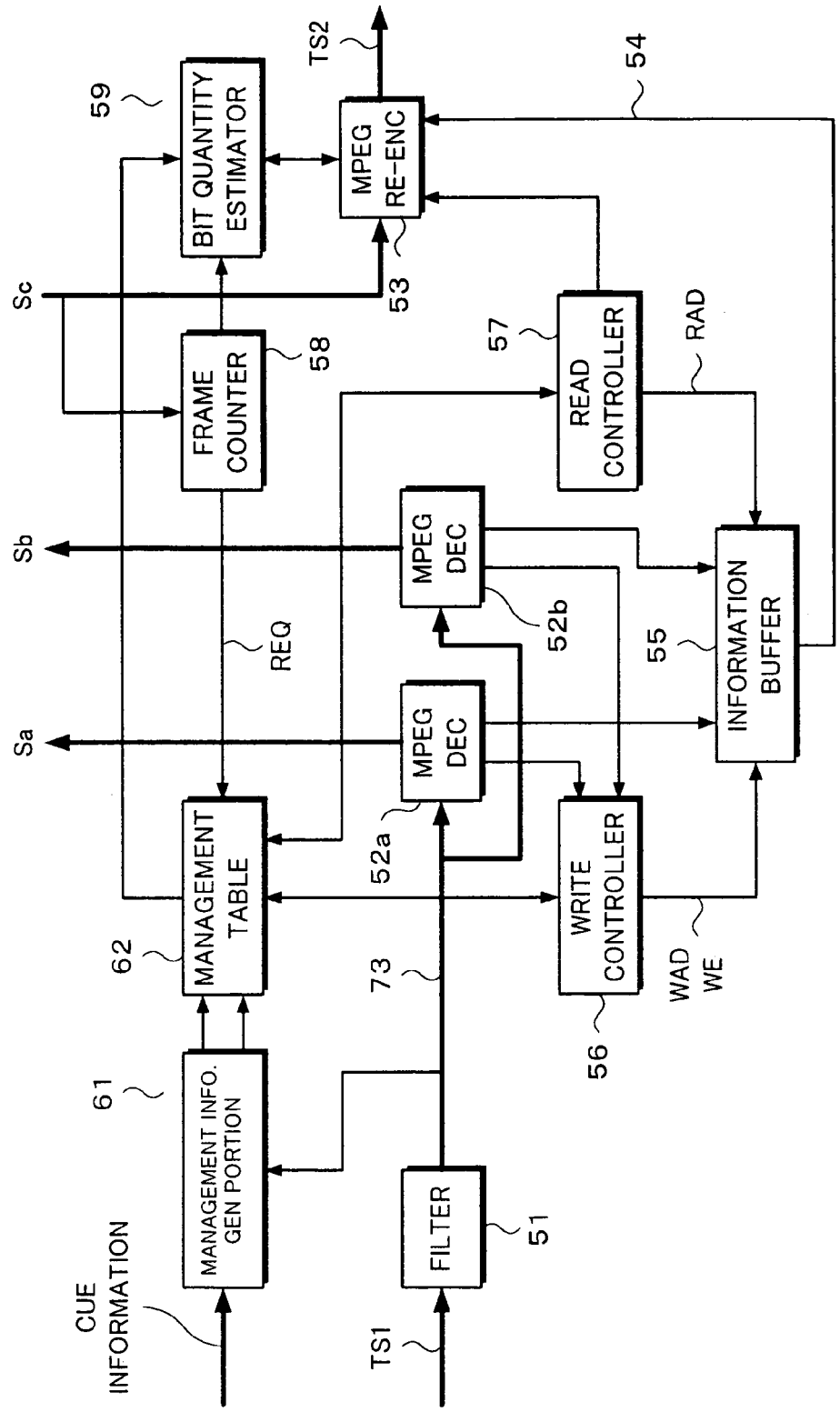
FIG. 5 is a block diagram showing an example of a splicer/transcoder as a principal portion according to the first embodiment of the present invention.
Figure 7:
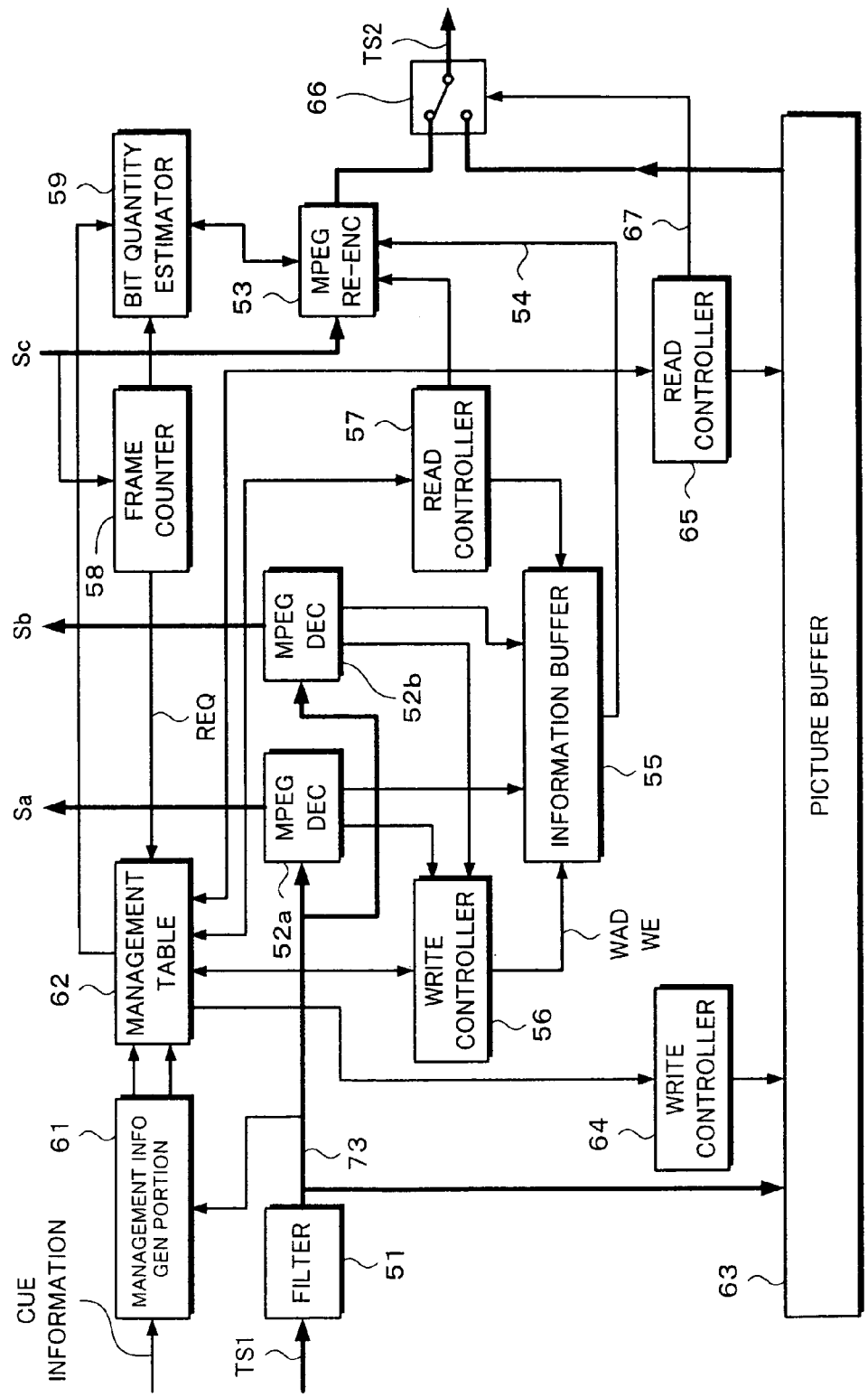
FIG. 7 is a block diagram showing another example of the structure of the splicer/transcoder as a principal portion according to the first embodiment of the present invention.

FIGS. 5 and 7 show a first example and a second example of the structure of the splicer/transcoder 21. In the first example shown in. FIG. 5, an input MPEG bit stream is fully transcoded. In the second example shown in FIG. 7, after an input MPEG bit stream is partly transcoded, the resultant stream is switched (spliced).

Next, the first example of the structure of the splicer/transcoder shown in FIG. 5 will be described. An MPEG bit stream TS1 such as an output signal of an archiver/server, a signal received from a satellite, or a signal received through a microwave circuit is input to the splicer/transcoder. The stream TS1 is a stream of which a plurality of programs (program materials) have been multiplexed. In the stream TS1, at least two programs have been multiplexed. In this example, the stream TS1 is a transport stream TS. Alternatively, the stream TS1 may be a time-division multiplexed elementary stream ES. However, in the case of the elementary stream ES, an identification tag or input information that identifies the current input stream is required.

Reference numeral 51 is a filter that extracts packets of two programs to be edited. In the case of a transport stream TS, with a PID (packet ID), a desired program can be extracted. In the case of an elementary stream ES, as described above, information such as an identification tag is required.

MPEG decoders 52a and 52b decode two streams A and B extracted by the filter 51. The MPEG decoder 52a obtains base band video/audio data Sa of the program A. The MPEG decoder 52b obtains base band video/audio data Sb of the program B. The base band data Sa and Sb are output to an external editor and switcher 22.

The base band editor and switcher 22 outputs return base band video/audio data Sc that has been edited to the splicer/transcoder. The base band data Sc is supplied to an MPEG re-encoder 53. The re-encoder 53 receives codec information for an MPEG re-encoding process corresponding to a video frame of the base band data Sc from an information buffer 55 through a path 54. Corresponding to the codec information for the re-encoding process, the data Sc is re-encoded for a desired bit quantity. The re-encoder 53 outputs a stream TS2 as the result of an AB roll editing operation of the input streams A and B. The codec information for the re-encoding process contains for example moving vector, picture type, quantizing step size, and quantizing level. With the transcoding process, the deterioration of the picture quality due to a decoding-encoding chain can be suppressed.

The splicer/transcoder interfaces with the editor and switcher 22 using only the base band data Sa, Sb, and Sc. Thus, it is not necessary to superimpose codec information with base band data. In FIGS. 5 and 7, a transmission path for transmitting a time code to the splicer/transcoder 21 corresponding to a request from the editor and switcher 22 is omitted.

Codec information used in the MPEG decoders 52a and 52b is input to the information buffer 55. A write address WAD and a write enable WE are supplied from a write controller 56 to the information buffer 55. In addition, a read address RAD is supplied from a read controller 57 to the information buffer 55. The information buffer 55 should supply codec information for the re-encoding process to the re-encoder 53 in synchronization with an edit point of the stream Sc. When video data Sc of which video data Sb has been connected to video data Sa at an edit point (in point) is returned, the codec information for re-encoding the video data Sa is switched to the codec information for re-encoding the video data Sb. The storage capacity of the information buffer 55 may correspond to the system delay (a time period for several frames) of the editor and switcher 22.

The phases of the video data Sa and the video data Sb received from the splicer/transcoder 21 and the phase of the video data Sc returned from the base band editor and switcher 22 are managed by a management table 62. Thus, the write controller 56 and the read controller 57 are connected to the management table 62. The management table 62 controls the write/read operations of the information buffer 55 with the picture count value of the input stream and the frame count value of the return video data Sc. A frame counter 58 counts the number of frames of the video data Sc and sends a read request REQ with a read address corresponding to the count value to the management table 62. The management table 62 has a structure of a ring buffer of which input information is successively written to an incremented address and that a read pointer is incremented corresponding to the read request REQ. Re-encode information of an address represented by the read pointer is read from the information buffer 55 and sent to the MPEG re-encoder 53 through the path 54. In association with the management table 62, a management information generating portion 61 is disposed. Cue information is input to the management information generating portion 61 (that will be described later).

Cue information for editing a program is supplied from the editor and switcher 22 or the control master to the management information generating portion 61 of the splicer/transcoder. The cue information is normally edit position information designated with a time code. In reality, cue information contains information of in-point/out-point. Corresponding to cue information, an edit frame is detected. Codec information is selected so that it is used in synchronization with the base band data Sc. When predetermined codec information is read by the read controller 57, an enable signal that represents that the codec information can be used is supplied from the read controller 57 to the re-encoder 53.

The re-encoder 53 is connected to a bit quantity estimator 59. The bit quantity estimator 59 performs a VBV buffer process. In other words, with the bit quantity estimator 59, the re-encoder 53 properly performs a re-encoding process so that the buffer of the decoder that decodes the MPEG bit stream TS2 does not overflow or underflow. To do that, a target bit quantity (information for assigning and weighting a generated bit quantity) in the vicinity of an edit point is supplied to the bit quantity estimator 53. The target bit quantity is written in a relevant index slot of the management table 62. When the re-encoding process is performed, the target generated bit quantity is satisfied. In the normal encoding process, when the generated bit quantity of the re-encoder 53 is insufficient against the designated target bit quantity, dummy data is added. In contrast, when the generated bit quantity exceeds the target bit quantity (in other words, in the situation that the buffer of the decoder will underflow), a macro block skipping process or a process for causing the predictive residual (namely, the difference between a macro block MB of a predictive picture and the relevant one of the considered picture) to be zero is performed. When such a process does not prevent the buffer from underflowing, the reproduced picture is affected by the processing method on the decoder side. Normally, until data is stored to the buffer, the reproduced picture freezes.

Figure 6:
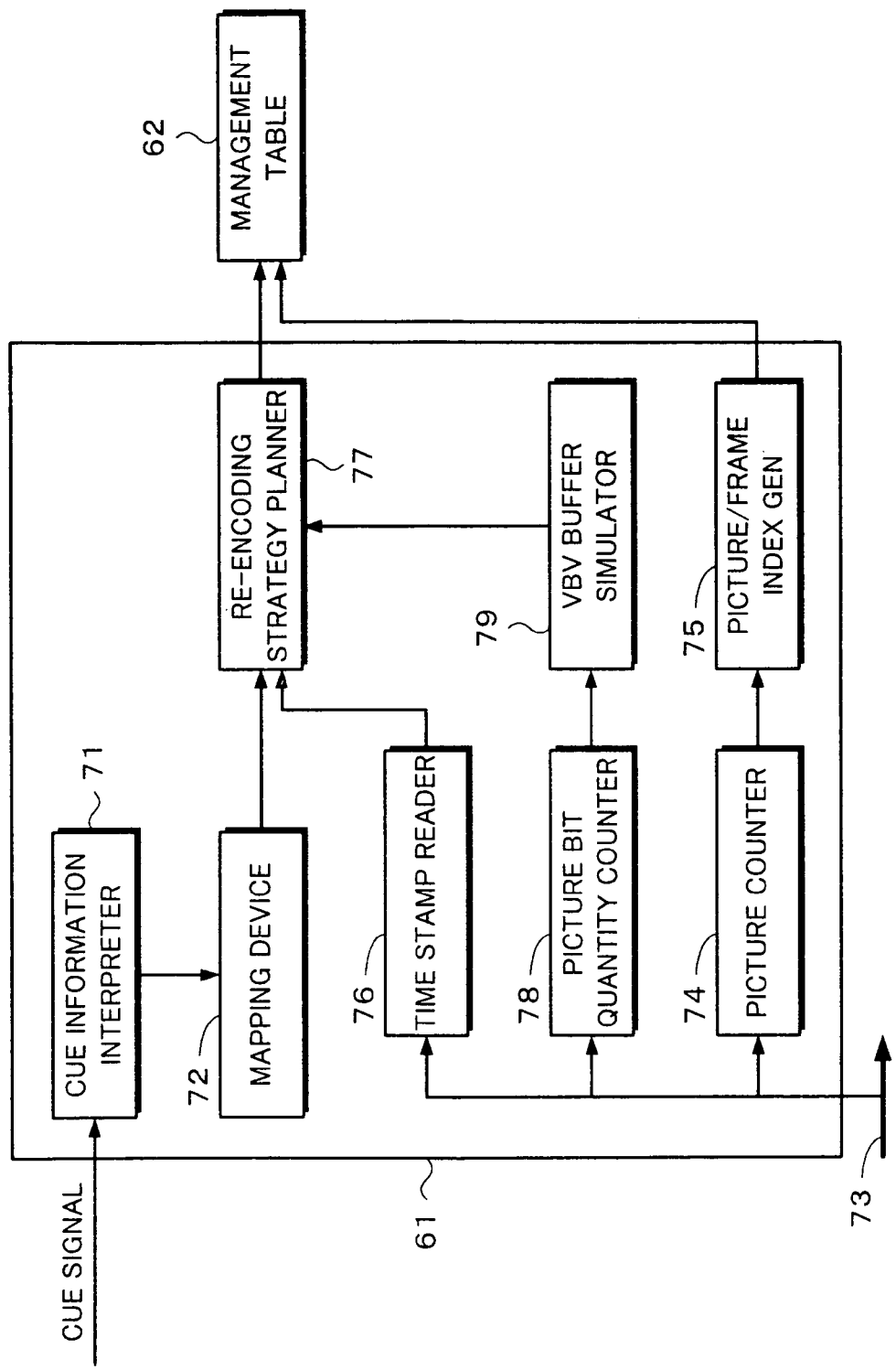
FIG. 6 is a block diagram showing an example of the structure of a management information generating portion of the splicer/transcoder.

FIG. 6 shows a detailed structure of the management information generating portion 61. Cue information as edit position information is supplied to a interpreter 71. When necessary, the interpreter 71 interprets the cue information. The resultant information that is output from the interpreter 71 is supplied to a mapping device 72. The mapping device 72 maps the cue information represented as a time code to a scale of a time stamp PTS (time management information of a reproduced output signal) of an input stream 73 extracted by the filter 51.

A picture counter 74 detects picture headers from the input stream 73 and counts the number of pictures. The number of pictures counted by the picture counter 74 is supplied to a picture/frame index generator 75. The picture/frame index generator 75 generates an index for pictures so as to arrange pictures and information of the management table 62. The management table 62 arranges the contents corresponding to the index and outputs management information with an address as the count value of frames of the video data Sc received from the frame counter 58.

A time stamp reader 76 reads a time stamp PTS from the input stream 73. The time stamp PTS and an output signal of the mapping device 72 are supplied to a re-encoding strategy planner 77. The output signal of the mapping device 72 is the result of which a time code that represents an edit point of a video frame has been mapped to the scale of a time stamp. Thus, the re-encoding strategy planner 77 correlates an edit point with a picture of the input stream 73. An output signal of the re-encoding strategy planner 77 is written to a relevant address of the management table 62 corresponding to the index.

Reference numeral 78 is a picture bit quantity counter that counts the generated bit quantity of the input stream 73. The picture bit quantity counter 78 supplies the counted result to a VBV buffer simulator 79. The VBV buffer simulator 79 simulates a VBV buffer. The VBV buffer has the storage capacity of the buffer on the decoder side. The storage capacity of the VBV buffer is estimated in the encoding process of the encoder. When the VBV buffer is simulated, the buffer on the decoder side can be prevented from underflowing or overflowing. The simulated result of the VBV buffer simulator 79 is supplied to the re-encoding strategy planner 77. The re-encoding strategy planner 77 assigns and weights a generated bit quantity in the vicinity of an edit point so as to perform a re-encoding process. The assigned and weighted bit quantity is written to a relevant index slot of the management table 62.

FIG. 7 shows the second example of the structure of the splicer/transcoder 21. In this example, the transcoding process is performed in the required minimum region that is affected by an editing operation. The input stream is switched with the transcoded stream. In this example, the deterioration of the picture quality that cannot be solved with the transcoding process can be remarkably suppressed.

The difference between the second example shown in FIG. 7 and the first example shown in FIG. 5 is in that an input stream 73 received from a filter 51 is stored in a picture buffer 63 and that a stream received from a picture buffer 63 is switched to a stream received from a re-encoder 53 by a switching circuit 66.

In the second example shown in FIG. 7, a write controller 64 and a read controller 65 are disposed. The write controller 64 controls the write operation of the picture buffer 63. The read controller 65 controls the read operation of the picture buffer 63. The write controller 64 and the read controller 65 are controlled with a management table 62. The picture buffer 63 is controlled so that the above-described codec information is written to the information buffer 55 and that codec information for a re-encoding process is read from the information buffer 55.

In the case of video data Sc of which video data Sa is switched to video data Sb, before the transcoding process is performed in the vicinity of an edit point, the switching circuit 66 selects a stream corresponding to the data Sa received from the picture buffer 63. After the transcoding process is performed, the switching circuit 66 selects a stream corresponding to the data Sb received from the picture buffer 63. The selecting operation of the switching circuit 66 is controlled corresponding to a control signal 67 received from the read controller 65. The storage capacity of the picture buffer 63 may be equivalent to the system delay (a time period for several frames) of the editor and switcher 22 plus the delay of the encoding process (several pictures). Thus, the picture buffer 63 does not adversely affect the structure of the system.

Next, a second embodiment of the present invention will be described. The outline of the structure of the editing system of to the second embodiment is the same as that of the first embodiment (see FIGS. 1, 2, and 3). The second embodiment can be applied to a broadcasting system as with the first embodiment (see FIG. 4). In the first embodiment of the present invention, a stream of an original material is encoded. Codec information of the encoding process is stored. Only a decoded base band signal is supplied to an editing device. The editing device edits a base band signal, matches the phase of the base band signal as the edited result with the stored codec information corresponding to cue information, re-encodes the base band signal as the edited result, and outputs the re-encoded signal as a stream. According to the first embodiment, since data is transmitted as a stream, the storage capacity of the record medium of the storing means can be reduced. In addition, a transmission medium can be effectively used. Moreover, with the transcoding process, the deterioration of picture quality can be remarkably suppressed. Furthermore, a conventional base band editing device can be directly used as an editing device.

In the first embodiment, since the conventional editing device that handles a base band signal represents an edit position with a time code, the edit position information should be interpreted so as to map the edit position information on a stream. In addition, the edit position information contains edit positions for frames or fields (and duration when a switching function such as a wipe operation is used). Thus, the edit position information does not represent a switching transition state in a frame (or a picture in the stream). Thus, codec information for a re-encoding process cannot be finely used in a frame.

On the other hand, according to the second embodiment of the present invention, such problems can be solved. In other words, without edit position information, first and second base band signals that are output to the editing device and a third base band signal that is returned from the editing device can be compared in the state that the phases of these signals match. Thus, a line for transmitting edit position information to the editing device can be omitted. In addition, it is not necessary to interpret the edit position information into the time axis of the stream.

Moreover, the validity of the use of codec information for a re-encoding process can be determined for each block as well as for each picture. Thus, even if two original materials co-exist in a picture at an edit point, the deterioration of the picture quality against the re-encoding process can be suppressed.

Thus, in the second embodiment, the splicer/transcoder 21 shown in FIGS. 1, 2, and 3 compares the output base band signals Sa, Sb, and the return base band signal Sc. Corresponding to the compared result, the splicer/transcoder 21 detects an edit position and selects codec information for a re-encoding process. The edit position information contains an edit position for each frame (picture) and edit data for each smaller block of each picture. The codec information contains for example moving vector, picture type, quantizing step size, and quantizing scale. To detect an edit position, a picture buffer that stores an original material is required. The storage capacity of each of the picture buffer and the information buffer is as small as that equivalent to the system delay (around several frames) of the editor and switcher 22.

Figure 8:
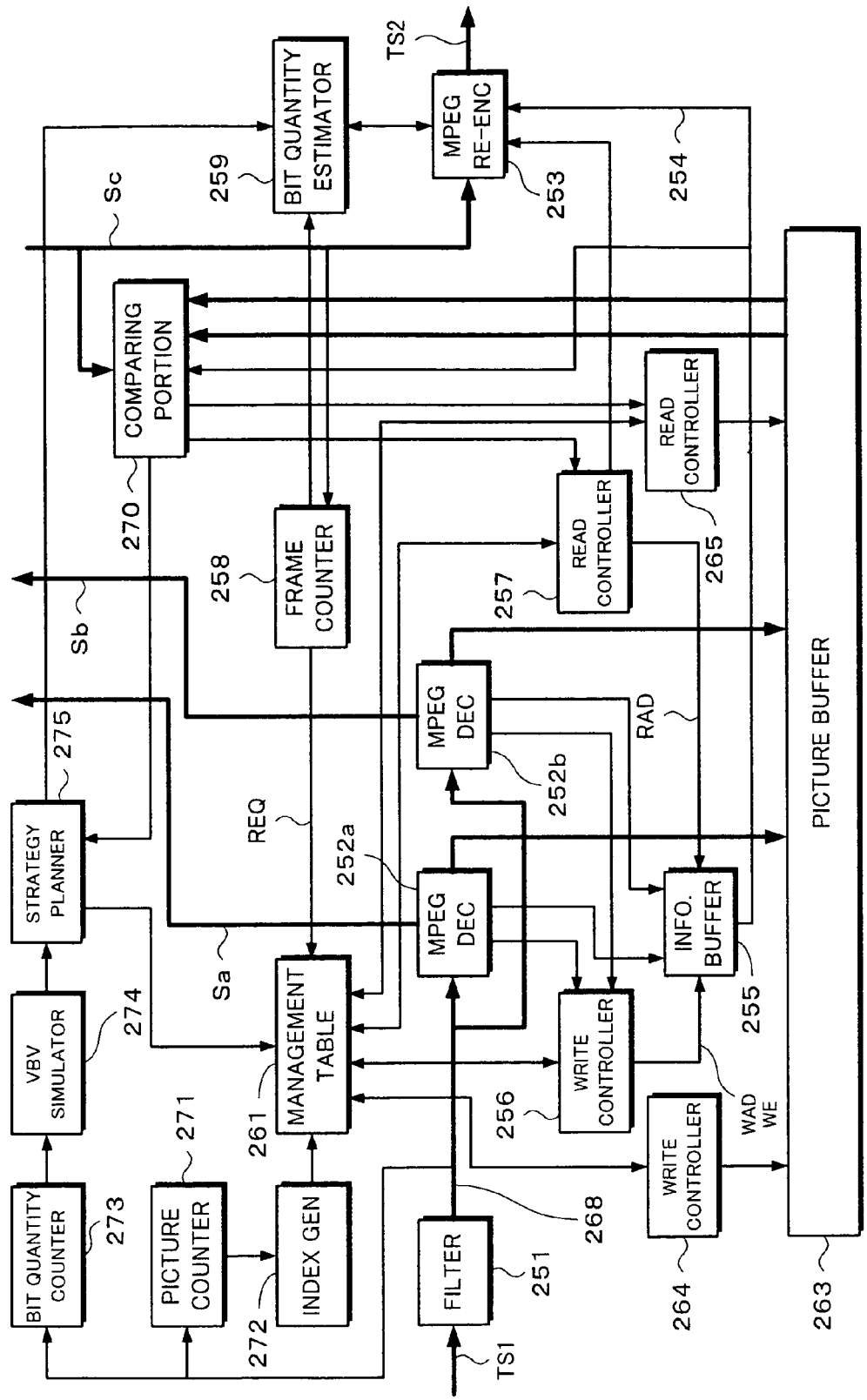
FIG. 8 is a block diagram showing another example of the structure of the splicer/transcoder as a principal portion according to a second embodiment of the present invention.

FIG. 8 shows an example of the structure of the splicer/transcoder 21 according to the second embodiment of the present invention. In the example shown in FIG. 8, an input MPEG bit stream is fully transcoded. Alternatively, after an input MPEG bit stream is partly transcoded, a stream may be switched (spliced). In other words, in a predetermined region including an edit point, a stream of which the base band signal Sc has been transcoded is selected. In other than the predetermined region, an input stream is selected. These operations are performed by a switching means. In the example of which an input stream is partly transcoded, since a decoding-encoding chain is performed for a part of the stream, the deterioration of the picture quality is remarkably suppressed.

Next, with reference to FIG. 8, the example of the structure of the splicer/transcoder will be described. An MPEG bit stream TS1 that is for example an output signal of an archiver/server, a signal received from a satellite, or a signal received through a microwave circuit is input. The stream TS1 is a stream of which a plurality of programs (program materials) have been multiplexed. In the stream TS1, at least two programs have been multiplexed. The stream TS1 may be an elementary stream ES of which signals have been time division multiplexed. In the case of the elementary stream ES, an identification tag or input information that identifies the current input stream is required.

Reference numeral 251 is a filter that extracts packets of two programs (original materials) A and B to be edited. In the case of the transport stream TS, the filter 251 extracts a desired program corresponding to a PID (packet ID). In the case of the elementary stream ES, as described above, information such as an identification tag is required. The filter 251 outputs a stream 268 of which the selected two programs A and B have been multiplexed.

The two programs A and B extracted by the filter 251 are decoded by MPEG decoders 252a and 252b, respectively. The MPEG decoder 252a obtains base band video/audio data Sa of the program A. The MPEG decoder 252b obtains base band video/audio data Sb of the program B. These base band data Sa and Sb are output to the external editor and switcher 22. In addition, the base band data Sa and Sb are stored to a picture buffer 263. A write controller 264 and a read controller 265 are disposed. The write controller 264 controls the write operation of the picture buffer 263. The read controller 265 controls the read operation of the picture buffer 263. A write address WAD and a write enable WE are supplied from the write controller 264 to the picture buffer 263. Likewise, a read address RAD is supplied from the read controller 265 to the picture buffer 263.

Codec information used in the decoding processes of the MPEG decoders 252a and 252b is input to an information buffer 255. A write address WAD and a write enable WE are supplied from the write controller 256 to the information buffer 255. A read address RAD is supplied from the read controller 257 to the information buffer 255. The information buffer 255 should supply codec information for the re-encoding process to the re-encoder 253 in synchronization with an edit point of the stream Sc. When video data Sc of which video data Sb has been connected to video data Sa at an edit point (in point) is returned, the codec information for re-encoding the video data Sa is switched to the codec information for re-encoding the video data Sb.

As described above, the storage capacity of the information buffer 255 and the picture buffer 263 may correspond to the system delay (a time period for several frames) of the editor and switcher 22. Thus, the information buffer 255 and the picture buffer 263 do not adversely affect the structure of the system.

The base band editor and switcher 22 outputs return base band video/audio data Sc that has been edited to the splicer/transcoder. The base band data Sc is supplied to an MPEG re-encoder 253. The re-encoder 253 receives codec information for an MPEG re-encoding process corresponding to a video frame of the base band data Sc from an information buffer 255 through a path 254. Corresponding to the codec information for the re-encoding process, the data Sc is re-encoded for a desired bit quantity. The re-encoder 253 outputs a stream TS2 as the result of an AB roll editing operation of the input streams A and B. The codec information for the re-encoding process contains for example moving vector, picture type, quantizing step size, and quantizing level. With the transcoding process, the deterioration of the picture quality due to a decoding-encoding chain can be suppressed.

Codec information is selected so that codec information is used in synchronization with the base band data Sc. When the read controller 257 reads predetermined codec information, the read controller 257 supplies to the re-encoder 253 an enable signal that represents the codec information can be used.

The input stream 268 and the base band signals Sa and Sb as the decoded results are correlated in the relation of 1:1:1 on the time base. When codec information used in the decoding processes of the MPEG decoders 252a and 252b is stored to the information buffer 255, the codec information is stored corresponding to an arrangement tag so that they have the relation of 1 to 1 on the time base. To store codec information and manage the phases of the video data Sa and the video data Sb received from the splicer/transcoder 21 and the phase of the video data Sc returned from the base band editor and switcher 22, a management table 262 is disposed. The management table 262 controls the write/read operations of the information buffer 255 and the picture buffer 263. The write controllers 256 and 264 and the read controllers 257 and 265 are connected to the management table 261.

The management table 261 controls the write/read operations of the information buffer 25 and the picture buffer 263 with the picture count value of the input stream and the frame count value of the return video data Sc. A frame counter 258 counts the number of frames of the video data Sc and sends a read request REQ with a read address corresponding to the count value to the management table 262. A picture counter 271 detects a picture header from the input stream 268 and counts the number of pictures. The number of pictures counted by the picture counter 271 is supplied to a picture/frame index generator 272. The picture/frame index generator 272 generates an index corresponding to a picture so as to arrange the management table 261 for pictures and information.

The management table 261 arranges the contents with the index and outputs management information with an address as the count value of the number of frames of the video data Sc received from the frame counter 258. The management table 261 has a structure of a ring buffer of which input information is successively written to an incremented address and that a read pointer is incremented corresponding to the read request REQ. Re-encode information of an address represented by the read pointer is read from the information buffer 255 and sent to the MPEG re-encoder 253 through the path 254. The picture buffer 263 is controlled in the same manner as the information buffer 255.

The re-encoder 253 is connected to a bit quantity estimator 259. The bit quantity estimator 259 performs a VBV buffer process. In other words, with the bit quantity estimator 259, the re-encoder 253 properly performs a re-encoding process so that the buffer of the decoder that decodes the MPEG bit stream TS2 does not overflow or underflow. When the re-encoding process is performed, the target generated bit quantity is satisfied. In the normal encoding process, when the generated bit quantity of the re-encoder 253 is insufficient against the designated target bit quantity, dummy data is added. In contrast, when the generated bit quantity exceeds the target bit quantity (in other words, in the situation that the buffer of the decoder will underflow), a macro block skipping process or a process for causing the predictive residual (namely, the difference between a macro block MB of a predictive picture and the relevant one of the considered picture) to be zero is performed. When such a process does not prevent the buffer from underflowing, the reproduced picture is affected by the processing method on the decoder side. Normally, until data is stored to the buffer, the reproduced picture freezes.

Reference numeral 273 is a picture bit quantity counter that counts the generated bit quantity of the input stream 268. The picture bit quantity counter 273 supplies the counted result to a VBV buffer simulator 274. The VBV buffer simulator 274 simulates a VBV buffer. The simulated result of the VBV buffer simulator 274 is supplied to the re-encoding strategy planner 275. The re-encoding strategy planner 275 assigns and weights a generated bit quantity in the vicinity of an edit point so as to perform a re-encoding process. The assigned and weighted bit quantity at the relevant index slot of the management table 261 is written to a relevant index slot of the management table 261. The target bit quantity (information of assigned and weighted bit quantity) in the vicinity of the edit point is supplied to the bit quantity estimator 253 so that the generated bit quantity of the re-encoding of the re-encoder 253 becomes proper.

The splicer/transcoder shown in FIG. 8 detects an edit point without edit position information received from the editing device so as to obtain an edit state of the base band signal Sc. To do that, the splicer/transcoder shown in FIG. 8 is equipped with a comparing portion 270. The comparing portion 270 receives two original base band signals Sa and Sb and a return base band signal Sc. The two original base band signals Sa and Sb are received from the picture buffer 263. The base band signal Sc is returned from the editor and switcher 22. In addition, the comparing portion 270 receives additional information such as GOP header, picture header, macro block type, and moving vector from the information buffer 255. The comparing portion 270 detects an edit point corresponding to matches of the signals Sa and Sb that are output to the editor and switcher 22 and the return signal Sc received therefrom. In addition, the comparing portion 270 determines whether or not codec information for a re-encoding process can be used for each picture and for each macro block.

Figure 9:
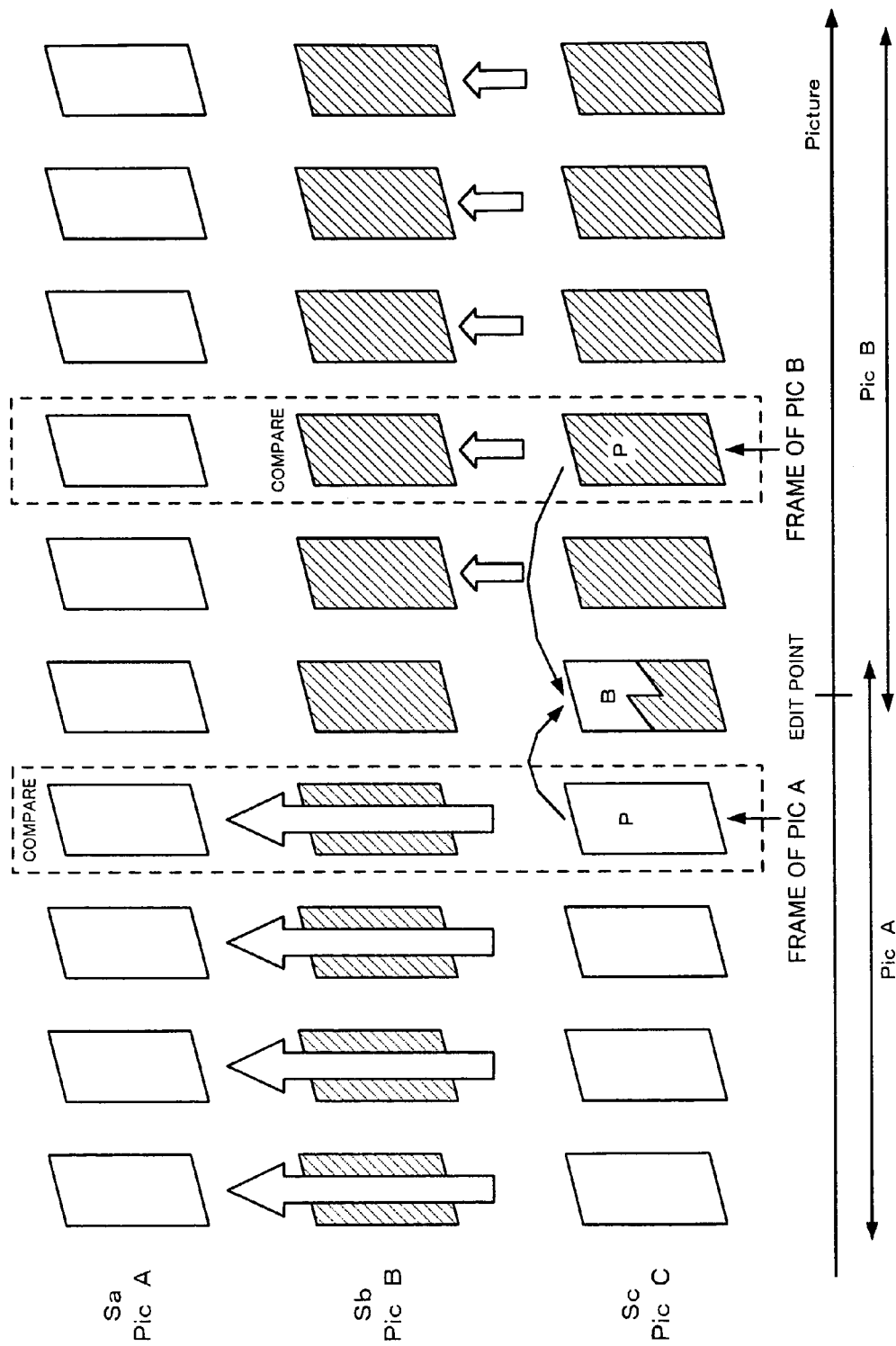
FIG. 9 is a schematic diagram for explaining chronological relation base band signals and a process for re-using codec information.

FIG. 9 shows an example of a base band signal Sc (referred to as picture PicC) as an edited result of a base band signal Sa (referred to as picture PicA) and a base band signal Sb (referred to as picture PicB) according to the second embodiment of the present invention. Codec information is stored for each picture or each macro block of the base band signal Sa and the base band signal Sb. In the example shown in FIG. 9, a wipe process, a cross fade process, or the like is performed for two pictures at an edit point rather than switched from picture PicA to picture PicB. In other words, before the edit point, each frame of the picture PicC matches each frame of the picture PicA. At the edit point, the frame of the picture PicC is an edited result of the frame of the picture PicA and the frame of the picture PicB. After the edit point, each frame of the picture PicC matches each frame of the picture PicB. Codec information for each picture or each macro block of the base band signals Sa and Sb is stored.

The comparing portion 270 determines whether or not the picture PicA matches the picture PicC in that state that their phases match. In addition, the comparing portion 270 determines whether or not the picture PicB matches the picture PicC in that state that their phases match. When the picture PicA does not match the picture PicC or when the picture PicB does not match the picture PicC, the comparing portion 270 detects a frame of an edit point. In reality, when the difference between pixels of a frame of one picture and pixels of a relevant frame of another picture is 0, the comparing portion 270 determines that the two pictures match. Otherwise, the comparing portion 270 determines that the two pictures do not match. For example, in the state that the phases of two pictures match, each pixel of one picture and each pixel of the other picture are successively supplied to a subtracting circuit. When the difference of two pixels is zero, the comparing portion 270 determines that the two pictures do not match. Alternatively, when the number of pixels that do not match becomes a predetermined value, the comparing portion 270 may determine that the two pictures do not match.

When such an edit point is detected, codec information used for the re-encoding process of the re-encoder 253 is selected. When a picture is switched for each frame, codec information to be re-used is selected for each frame. However, when two pictures are placed in a picture at an edit point as with the example shown in FIG. 9, with a process for selecting codec information for each frame, the deterioration of the picture quality against the re-encoding process cannot be sufficiently prevented.

Thus, according to the second embodiment of the present invention, the re-use of codec information (for a re-encoding process) is determined for each macro block. Next, an evaluating process and a determining process for re-using codec information for each macro block will be described. These processes are performed by the comparing portion 270.

Figure 10:
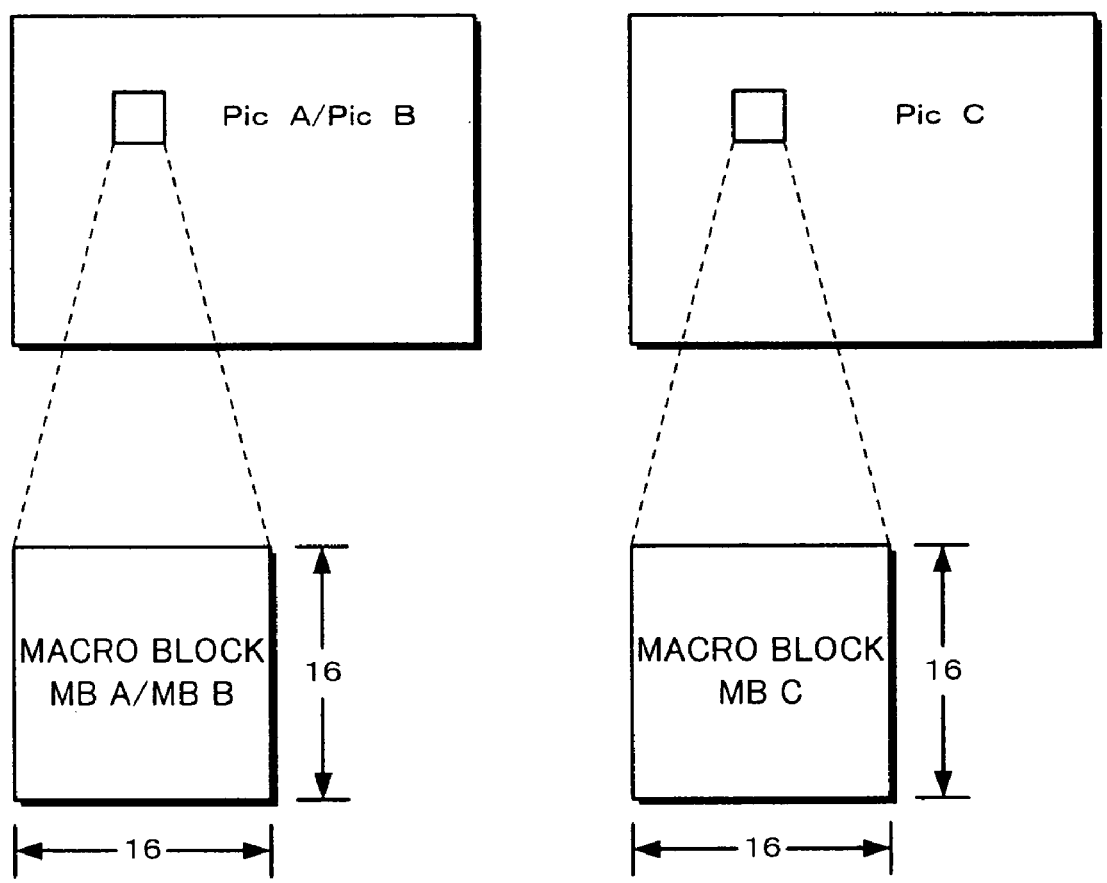
FIG. 10 is a schematic diagram showing the relation between pictures and macro blocks.

As shown in FIG. 10, a macro block (denoted by MBA or MBB) of a picture PicA (or a picture PicB) and a macro block (denoted by MBC) of a picture PicC are compared in the state that the spatial position of the macro block MBA (MBB) matches the spatial position of the macro block MBC. In this example, the size of each macro block is (16×16). The determination for match/non-match for each macro block is performed in the same manner as each frame.

Figure 11:
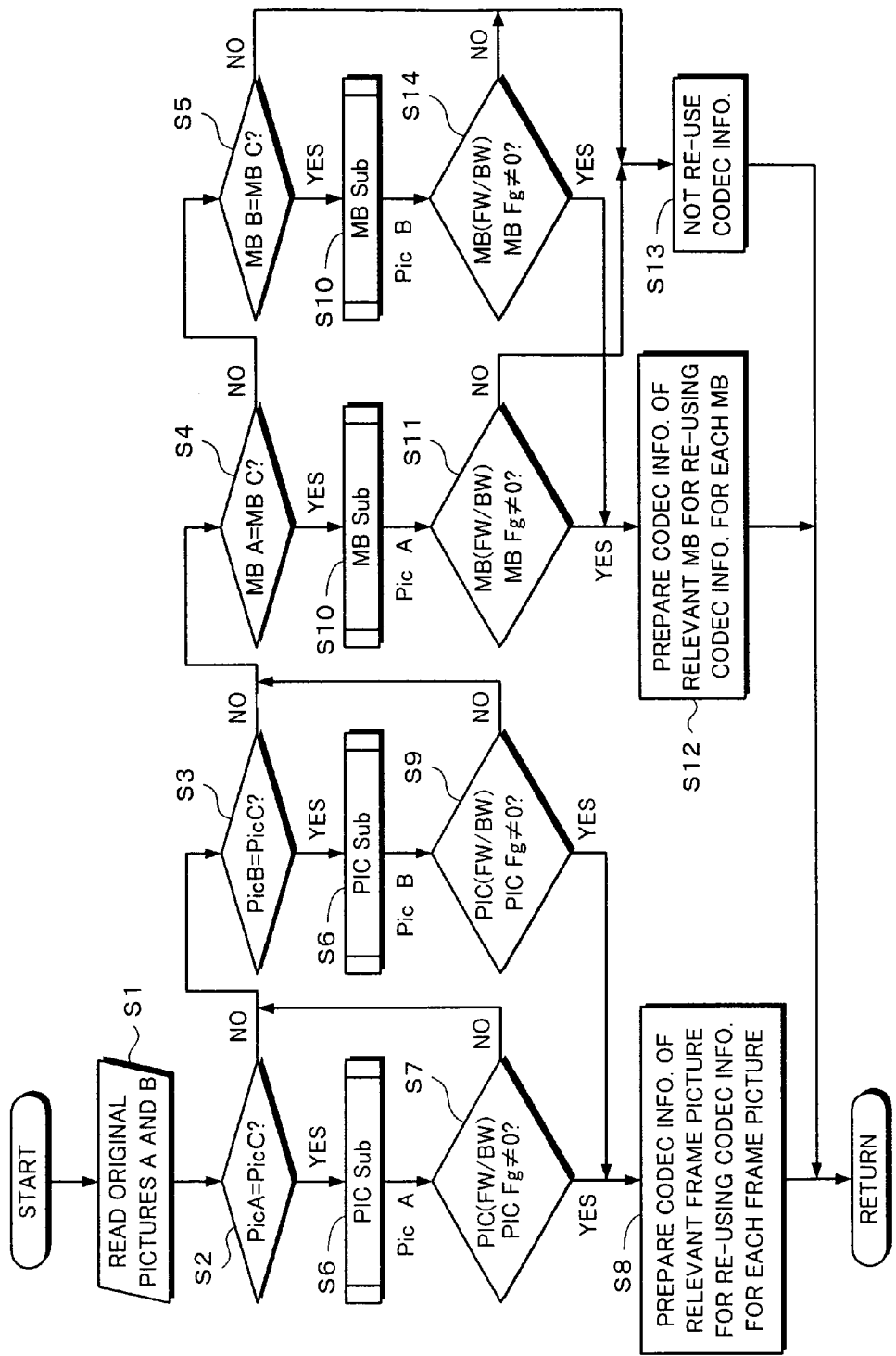
FIG. 11 is a flow chart showing a determining process for the re-use of codec information.

FIG. 11 is a flow chart showing a process for determining whether or not codec information can be re-used. When a video signal Sc (picture PicC) that has been edited is received from the editor and switcher, the process gets started. At step S1, original pictures A and B are read from the picture buffer 263.

At step S2 (as a comparing step), the pictures A and C are compared. When the determined result at step S2 is No (namely, the pictures A and C do not match), the flow advances to step S3. At step S3, the pictures B and C are compared. When the determined result at step S3 is No (namely, the pictures B and C do not match), the flow advances to step S4. At step S4, macro blocks MBA and MBC are compared. When the determined result at step S4 is No (namely, the macro blocks MBA and MBC do not match), the flow advances to step S5. At step S5, the macro blocks MBB and MBC are compared. As described above, two macro blocks are compared in the state that their spatial positions are the same.

When the determined result at step S2 is Yes (namely, PicA=PicC), with codec information used for decoding the picture A, the picture C is re-encoded. In the MPEG system, there are three types of pictures that are an I (Intra) picture as an intra-frame encoded picture, a P (Predictive) picture as an inter-frame forward predictive encoded picture, and a B (Bidirectionally predictive) picture. Corresponding to the picture type, the condition of the re-use of codec information varies. Thus, when the determined result at step S2 is Yes, the flow advances to step S6 as a frame picture subroutine (that will be described later).

Thereafter, the flow advances to step S7. At step S7, it is determined whether or not a predictive frame picture of the picture C is a frame picture of the picture A (namely, PIC (FW/BW), PIC Fg≠0?). When the determined result at step S7 is Yes (namely, the condition is satisfied), codec information of the relevant frame picture is prepared for re-using codec information for each frame picture (at step S8). When codec information for each frame picture is re-used, codec information for a one-side frame picture may be used for re-encoding bidirectional predictive frame pictures.

When the determined result at step S7 is No (namely, the condition at step S7 is not satisfied), as with the case that the condition of PicA=PicC? at step S3 is not satisfied, the flow advances to step S3. In other words, when a predictive frame picture of the picture C is not a frame picture of the picture A, the next condition is searched.

When the determined result at step S3 is Yes (namely, PicB=PicC), with codec information of the picture B, the picture C is re-encoded. In this case, corresponding to the picture type, the condition of the re-use of the codec information varies. Thus, the flow advances to step S6 as the frame picture subroutine. Thereafter, the flow advances to step S9. At step S9, as with step S7 for the picture A, it is determined whether or not a predictive frame picture of the picture C is a frame picture of the picture B. When the determined result at step S9 is Yes (namely, the condition at step S9 is satisfied), the flow advances to step S8. At step S8, codec information of the relevant frame picture is prepared for re-using codec information for each frame picture. In reality, codec information of the relevant frame picture is read from the information buffer 255 and supplied to the re-encoder 253.

When the determined result at step S9 is No (namely, the condition at step S9 is not satisfied), as with the case of the condition PicB≠PicC, the flow advances to step S4. In other words, when the conditions (PicA≠PicC) and (PicB≠PicC) are satisfied, it is determined whether or not macro blocks of two pictures match (MBA=MBC). As shown in FIG. 9, when the pictures A and B co-exist in a frame picture at an edit point of the picture C, the conditions (PicA≠PicC) and (PicB≠PicC) are satisfied. In this case, codec information is re-used for each macro block.

When the determined result at step S4 is Yes (namely, MBA=MBC), with codec information of the macro block MBA, the macro block MBC is re-encoded. In the MPEG system, unlike with the picture types, there are four macro block types that are an intra-frame encoded macro block, a forward inter-frame predictive macro block for predicting a future macro block with a past macro block, a backward inter-frame predictive macro block for predicting a past macro block with a future macro block, and an interpolative macro block for predicting a considered macro block with a past macro block and a future macro block.

An I picture contains only intra-frame encoded macro blocks. A P picture contains intra-frame encoded macro blocks and forward inter-frame predictive macro blocks. A B picture contains all four types of macro blocks. Corresponding to the macro block type, the condition for the re-use of codec information varies. Thus, when the determined result at step S4 is No, the flow advances to step S10 as a macro block subroutine (that will be described later).

Thereafter, the flow advances to step S11. At step S11, it is determined whether or not a predictive macro block of the picture C is a macro block of the picture A (namely, MB (FW/BW), MB Fg≠0 ?). When the determined result at step S11 is Yes, the flow advances to step S12. At step S12, codec information of the relevant macro block is prepared for re-using codec information for each macro block. When codec information is re-used for each macro block, codec information of a one-side macro block of bidirectional predictive macro blocks may be used.

When the determined result at step S11 is No (namely, the predictive macro block of the picture C is not a macro block of the picture A), the flow advances to step S13. At step S13, codec information is not re-used. In this case, the transcoding process is not performed. Instead, an encoding process is simply performed.

When the determined result at step S4 is No (namely, MBA≠MBC), the flow advances to step S5. At step S5, it is determined whether or not the condition MBB=MBC is satisfied. When the determined result at step S5 is No (namely, MBB≠MBC), the flow advances to step S13. At step S13, the codec information is not re-used. When the determined result at step S5 is Yes (namely, MBB=MBC), with the codec information of the macro block MBB, the macro block MBC is re-encoded. In this case, corresponding to the macro block type, the condition of the re-use of codec information varies. Thus, the flow advances to step S10 as the macro block subroutine. Thereafter, the flow advances to step S14. At step S14, as with step S11, it is determined whether or not the predictive macro block of the picture C is a macro block of the picture B. When the determined result at step S14 is Yes (namely, the condition at step S14 is satisfied), the flow advances to step S12. At step S12, codec information of the relevant macro block is prepared for re-using codec information for each macro block. In reality, the codec information of the relevant macro block is read from the information buffer 255 and supplied to the re-encoder 253. When the determined result at step S14 is No (namely, the condition at step S14 is not satisfied), the flow advances to step S13. At step S13, the codec information is not re-used.

Figure 12:
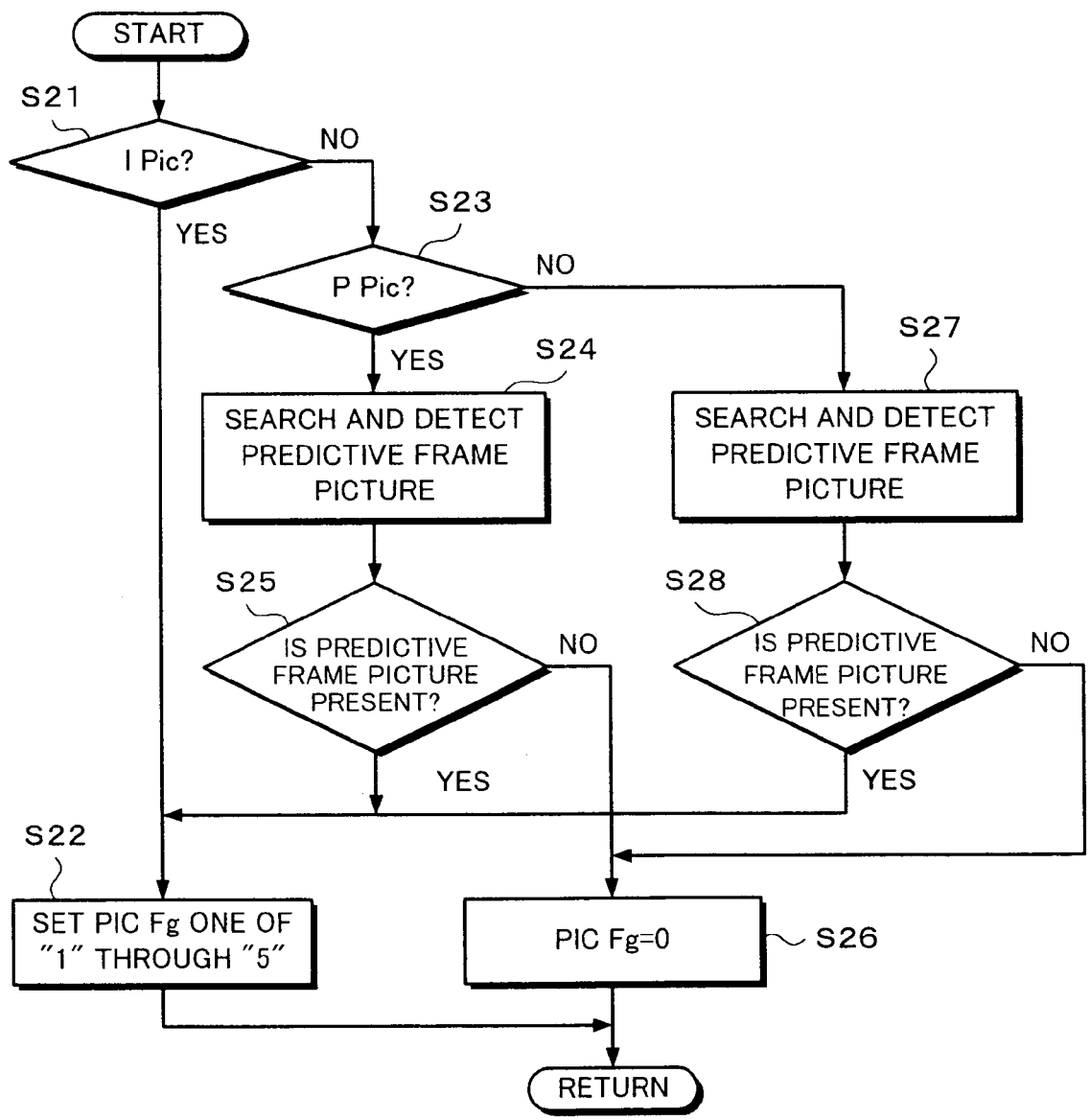
FIG. 12 is a flow chart showing a picture sub-routine shown in FIG. 11.

Next, with reference to FIG. 12, the frame picture subroutine at step S6 will be described in detail. At step S21, it is determined whether or not the considered frame picture is an I picture. The picture type is determined corresponding to information of a picture header stored in the information buffer 255. When the determined result at step S21 is Yes (namely, the considered frame picture is an I picture), the flow advances to step S22. At step S22, the picture flag PIC Fg is set to "1". The picture flag PIC Fg that represents whether or not a predictive frame picture is present for each picture is defined as follows.

PIC Fg=0: A relevant frame picture is absent.
PIC Fg=1: A relevant frame picture is present in the considered frame.
PIC Fg=2: A predictive frame picture that is a P picture is present in the forward direction.
PIC Fg=3: A predictive frame picture that is a B picture is present in the forward direction.
PIC Fg=4: A predictive frame picture that is a B picture is present in the backward direction.
PIC Fg=5: Predictive frame pictures that are B pictures are present in the forward and backward directions.

At step S22, when codec information is re-used, the picture flag PIC Fg that represents a predictive frame picture is set. The picture flag is used to determine whether or not codec information is re-used. In addition, the picture flag is used to define codec information supplied from the information buffer 255 to the re-encoder 253.

When the determined result at step S21 is No (namely, the considered frame picture is not an I picture), the flow advances to step S23. At step S23, it is determined whether or not the considered frame picture is a P picture. When the determined result at step S23 is Yes (namely, the considered frame picture is a P picture), the flow advances to step S24. At step S24, a predictive frame picture is searched and detected. In this case, since the frame picture has been encoded so that it is predicted with a past frame picture, a predictive frame picture based on the encoding process is detected from the past frame picture. The position of the past predictive frame picture is determined corresponding to information of a GOP sequence contained in a GOP header.

At step S25, it is determined whether or not the predictive frame picture of the picture C is present in the picture A (in the case of the subroutine following step S2 shown in FIG. 11) or the picture B (in the case of the subroutine following step S3 shown in FIG. 11). This determination is performed by comparing the predictive frame picture with a frame picture of the picture A or B in the state that their positions are the same on the time base. When the determined result at step S25 is Yes (namely, the predictive frame picture is present in the picture A or B), the flow advances to step S22. At step S22, as described above, the picture flag is set to "2". When the determined result at step S25 is no (namely, the predictive frame picture is not present in the picture A or B), the picture flag PIC Fg is set to "0" (at step S26).

When the determined result at step S23 is No (namely, the considered frame picture is not a P picture, but a B picture), the flow advances to step S27. At step S27, the predictive frame picture is searched and detected. Thereafter, the flow advances to step S28. At step S28, it is determined whether or not the predictive frame picture of the picture C is present in the picture A or B. When the determined result at step S28 is No (namely, the predictive frame picture of the picture C is not present in the picture A or B), the flow advances to step S26. At step S26, the picture flag PIC Fg is set to "0". When the determined result at step S28 is Yes (namely, the predictive frame picture of the picture C is present in the picture A or B), the flow advances to step S22. At step S22, as described above, depending on whether the predictive frame picture that is a B picture is present in the backward direction (past), in the forward direction (future), or in the forward/backward directions, the picture flag PIC Fg is set to "3", "4", or "5", respectively.

In such a manner, the determination for the re-use of codec information is performed for each frame picture. In the example shown in FIG. 9, the frame picture at the edit point is a B picture. In the case of a B picture, as shown with the flow chart in FIG. 12, a predictive frame picture (P picture) in the forward direction of the edit point and a predictive frame picture (P picture) in the backward direction of the edit point are searched. The predictive frame picture in the forward direction and the frame picture in the picture A are compared. When they match, it is determined that the predictive frame picture is present in the forward direction. In addition, the frame picture in the backward direction and the frame picture in the picture A are compared. When they match, it is determined that the predictive frame picture is present in the backward direction. Frame pictures in the forward direction and the backward direction of an edit point may match a frame picture in the picture A. In the example shown in FIG. 9, since two frame pictures co-exist in the considered frame picture, the conditions at steps S2 and S3 are not satisfied. Thus, a determining process for each macro block is performed.

Figure 13:
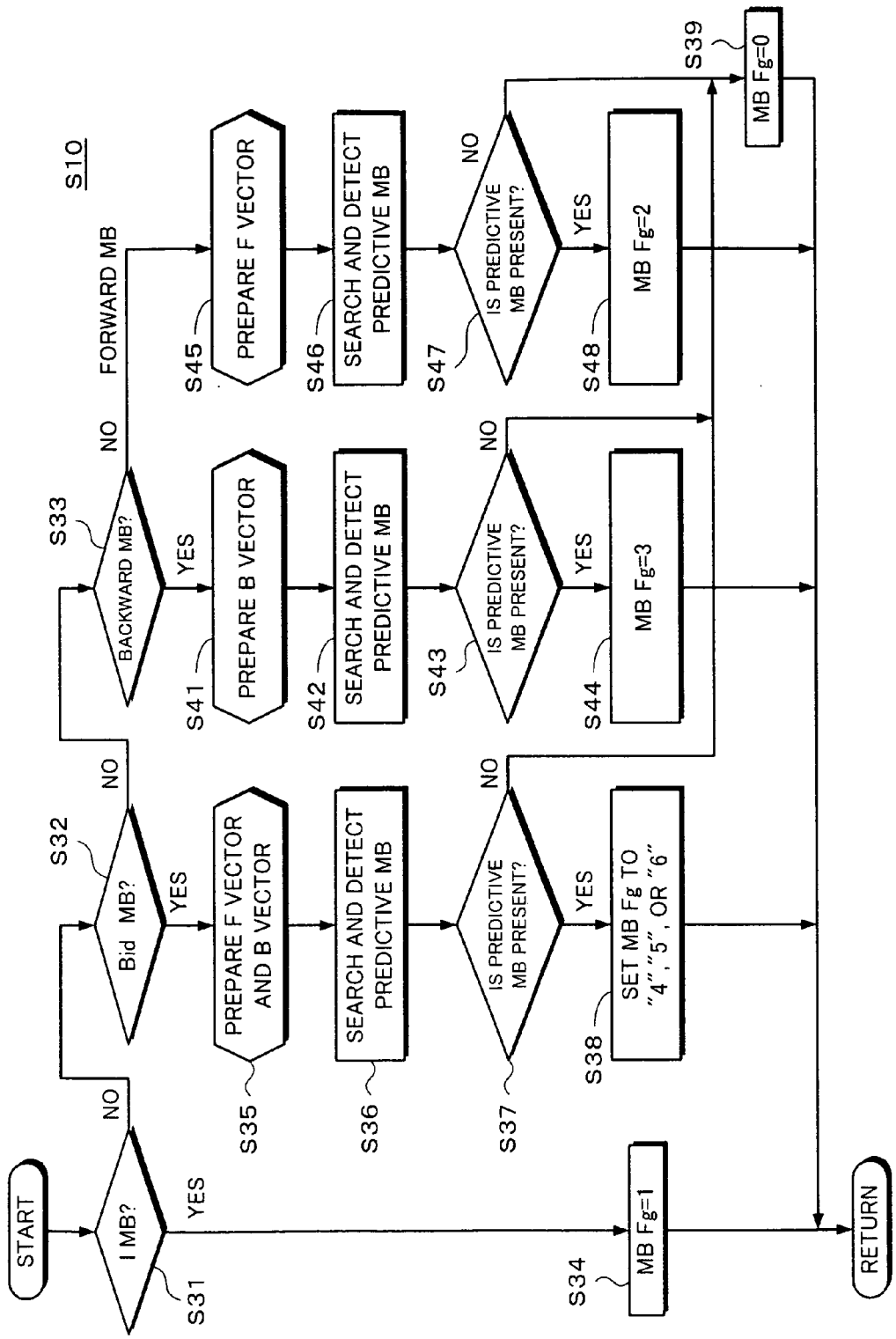
FIG. 13 is a flow chart showing a macro block sub-routine shown in FIG. 11.

FIG. 13 is a flow chart showing a re-use determining process for codec information for each macro block (a macro block subroutine at step S10). At steps S31, S32, and S33, a macro block type is determined. The macro block type is contained in a macro block mode of a macro block layer of MPEG2 syntax. Corresponding to the information, the macro block type is determined.

At step S31, it is determined whether or not the considered macro block is an intra-frame encoded macro block (I MB). When the determined result at step S31 is No (namely, the considered macro block is not an I MB), the flow advances to step S32. At step S32, it is determined whether or not the considered macro block is an interpolative (bidirectional) macro bock Bid MB. When the determined result at step S32 is No (namely, the considered macro block is not a Bid MB), the flow advances to step S33. At step S33, it is determined whether or not the considered macro block is a backward inter-frame predictive macro block (or simply a backward macro block as shown in FIG. 13). When the determined result at step S33 is No (namely, the considered macro block is neither an I MB, nor a Bid MB, nor a backward macro block), the considered macro block is a forward inter-frame predictive macro block (or simply a forward macro block as shown in FIG. 13).

It is determined whether or not codec information can be re-used for each macro block type. When the determined result at step S31 is Yes (namely, the considered macro block is an I MB), the flow advances to step S34. At step S34, a macro block flag MB Fg is set to "1". When the determined result at step S31 is No (namely, the considered macro block is other than an I MB), a moving vector is selected. It is determined whether or not a macro block corresponding to a predictive macro block is present in the picture A or B at a position moved by the moving vector. When these conditions are satisfied, codec information can be re-used.

The macro block flag MB Fg that presents whether or not a predictive macro block is present in the picture A or B for each macro block is defined as follows.

MB Fg=0: A relevant macro block is absent.

MB Fg=1: A relevant macro block is present in the considered frame.

MB Fg=2: A relevant macro block is present in the forward direction of the edit point.

MB Fg=3: A relevant macro block is present in the backward direction of the edit point.

MB Fg=4: Relevant macro blocks are present in the forward direction and the backward direction of the edit point.

MB Fg=5: A macro block is present in the forward side of the forward direction and the backward direction of the edit point.

MB Fg=6: A macro block is present in the backward side of the forward direction and the backward direction of the edit point.

The macro block flag is used to determine whether or not codec information can be refused for each macro block. In addition, the macro block flag is used to define codec information supplied from the information buffer 255 to the re-encoder 253.

When the determined result at step S32 is Yes (namely, the considered macro block is a bidirectional macro block), a froward moving vector and a backward moving vector are prepared (at step S35). With these moving vectors, a predictive macro block is searched and detected (at step S36). Since the position of the predictive macro block corresponds to the GOP sequence, the predictive macro block is detected corresponding to information of the GOP sequence contained in the GOP header.

Thereafter, the flow advances to step S37. At step S37, it is determined whether or not the predictive macro block is present in the picture A (in the case of the subroutine following step S4 shown in FIG. 11) or in the picture B (in the case of the subroutine following step S5 shown in FIG. 11). This determination is performed by comparing the predictive macro block with a picture block equivalent to a macro block in the picture A or B, the picture block being present at a position of which the predictive macro block is moved by the moving vector.

When the determined result at step S37 is Yes (namely, the predictive macro block is present in the picture A and/or the picture B), the flow advances to step S38. At step S38, the macro block flag MB Fg is set to "4", "5", or "6". When the determined result at step S37 is No (namely, a macro block corresponding to the predictive macro block is not present), the flow advances to step S39. At step S39, the macro block flag MB Fg is set to "0". When the macro block flag MB Fg is "0", it represents that codec information cannot be used for each macro block.

Figure 14:
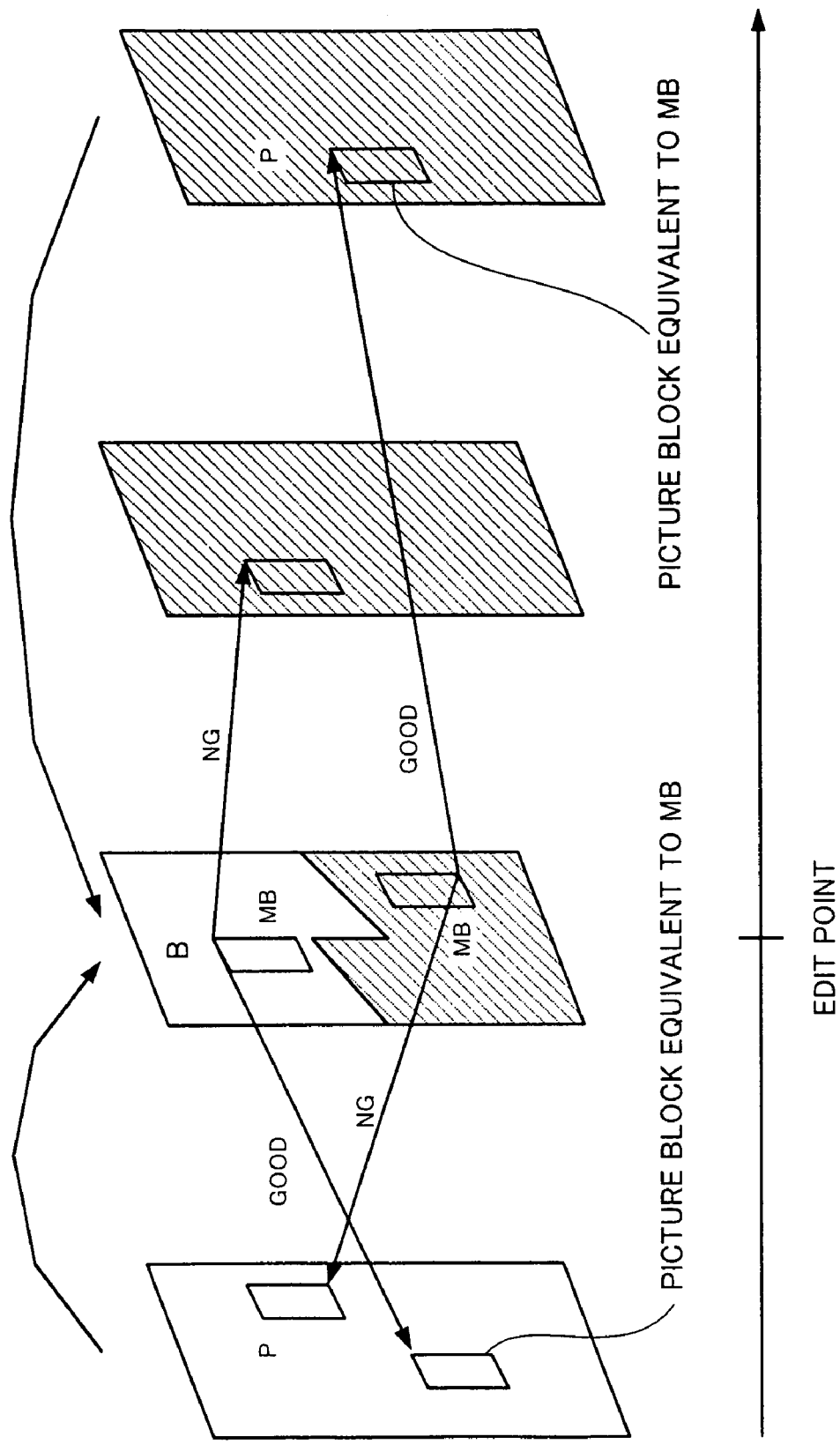
FIG. 14 is a schematic diagram for explaining the re-use of codec information for each macro block.
Figure 15:
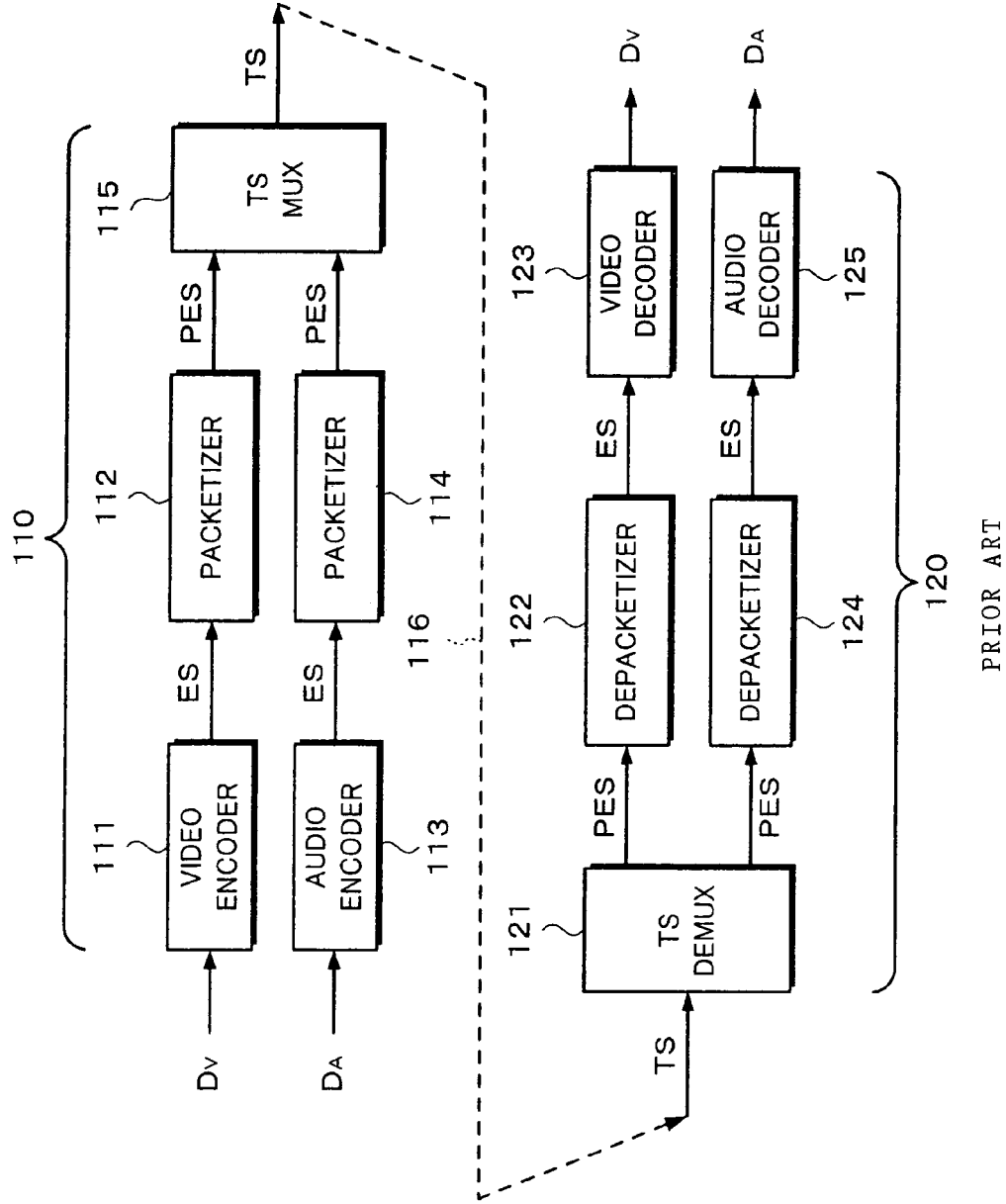
FIG. 15 is a block diagram showing a conventional MPEG encoding/decoding system.
Figure 16:
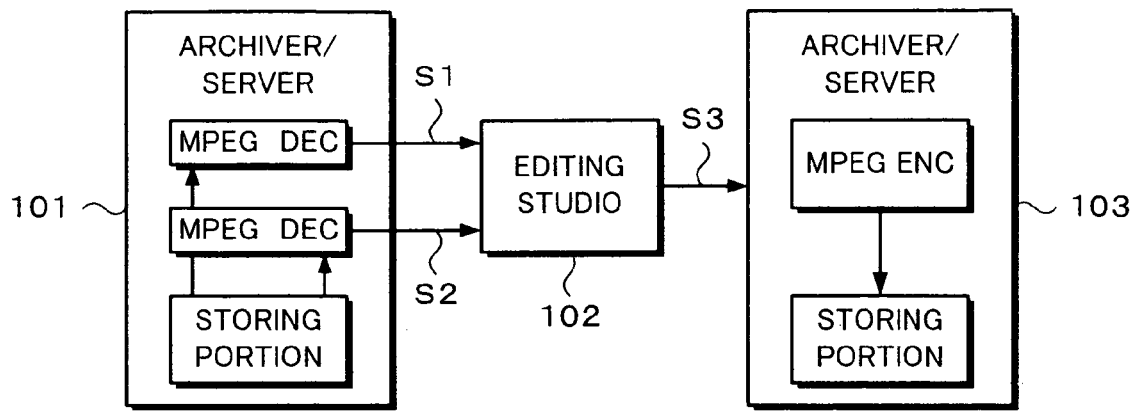
FIG. 16 is a block diagram showing an example of the structure of a system in a broadcasting station as a reference for explaining the present invention.
Figure 17:
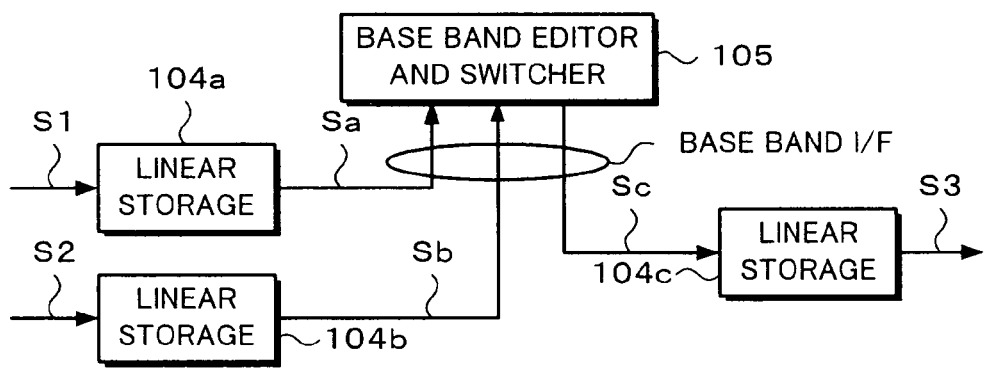
FIG. 17 is a block diagram showing an example of the structure of an editing studio shown in FIG. 16.
Figure 18:
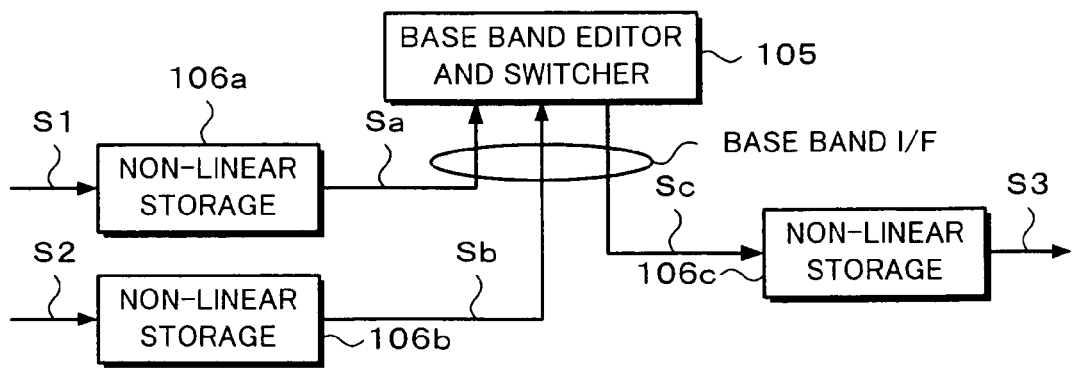
FIG. 18 is a block diagram showing another example of the editing studio shown in FIG. 16.
Figure 19:
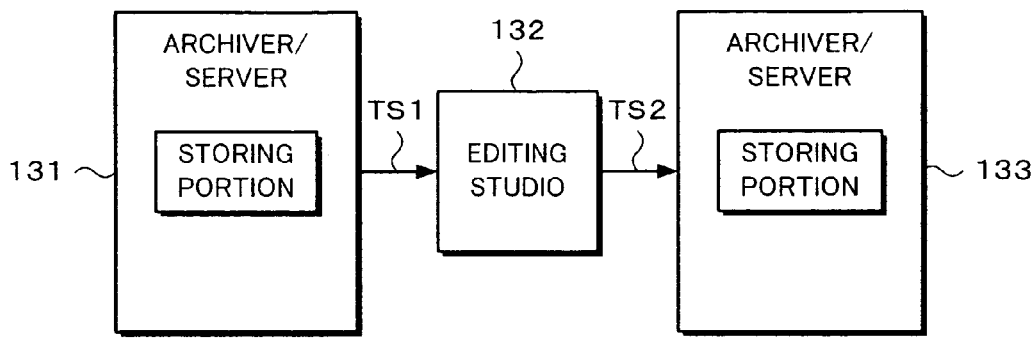
FIG. 19 is a block diagram showing another example of the structure of the system in the broadcasting station as a reference for explaining the present invention.
Figure 20:
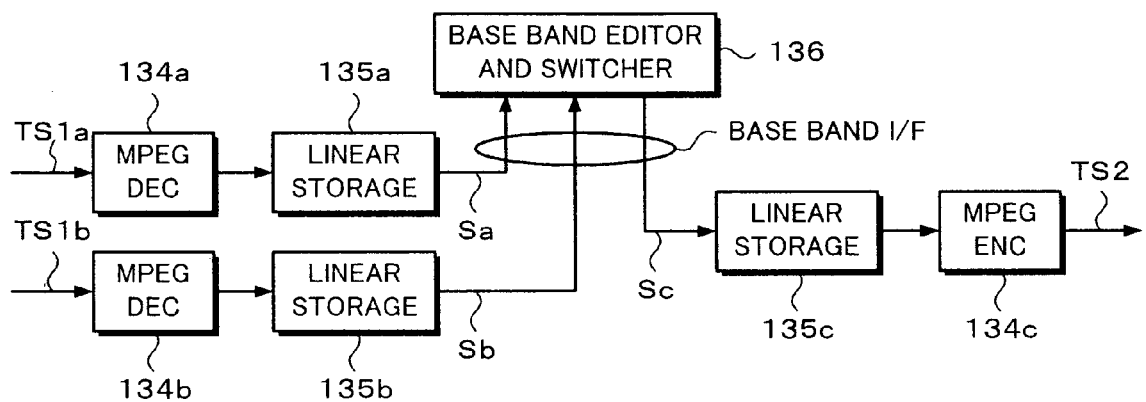
FIG. 20 is a block diagram showing an example of an editing studio shown in FIG. 19.
Figure 21:
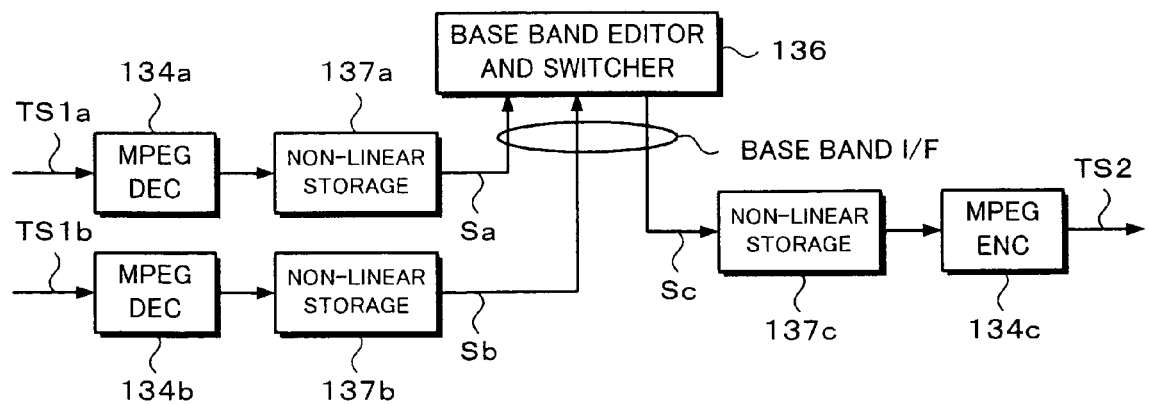
FIG. 21 is a block diagram showing another example of the editing studio shown in FIG. 19.
Figure 22:
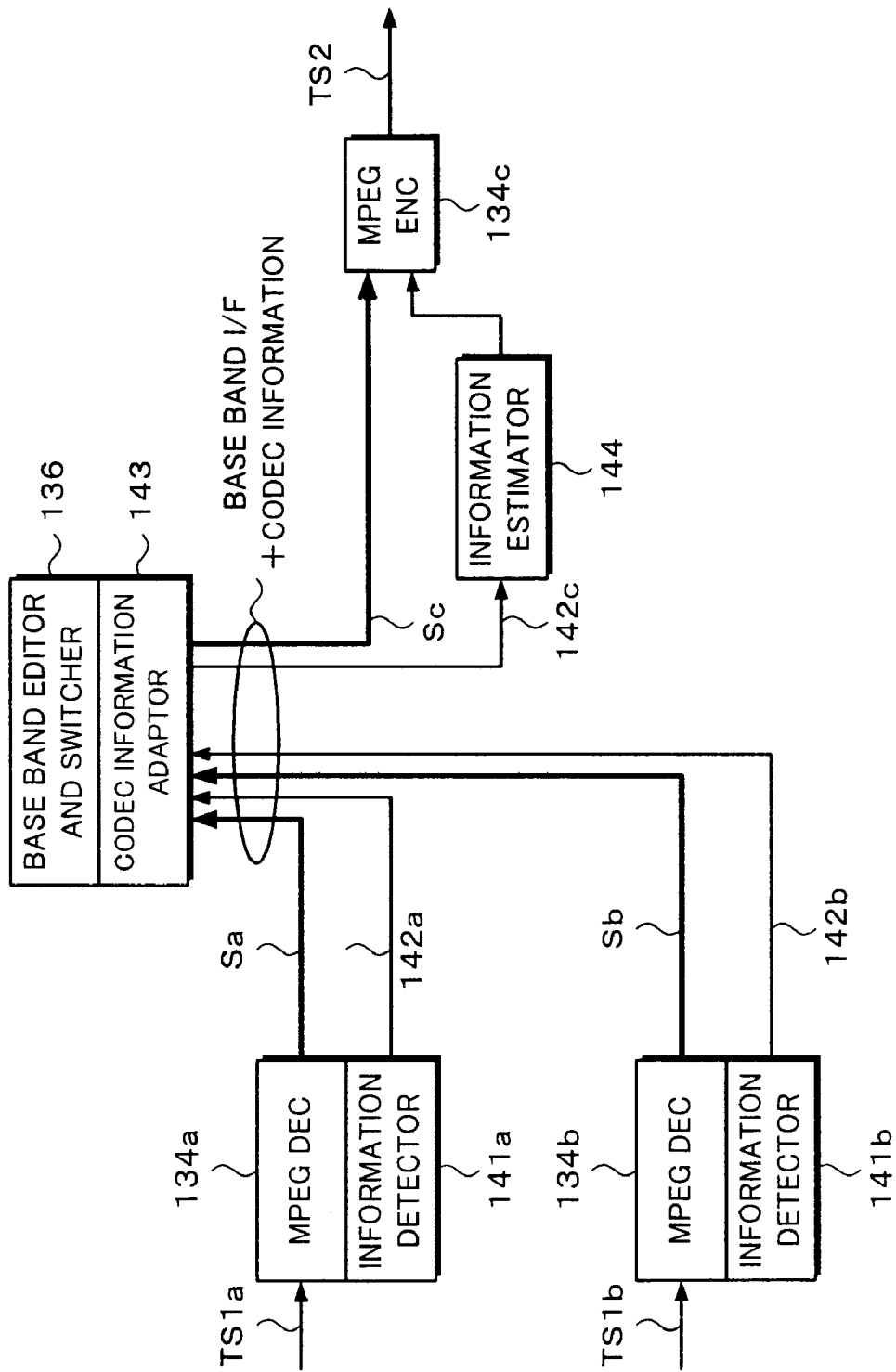
FIG. 22 is a block diagram showing an example of the structure of an editing studio as a reference for explaining the present invention.
Figure 23:
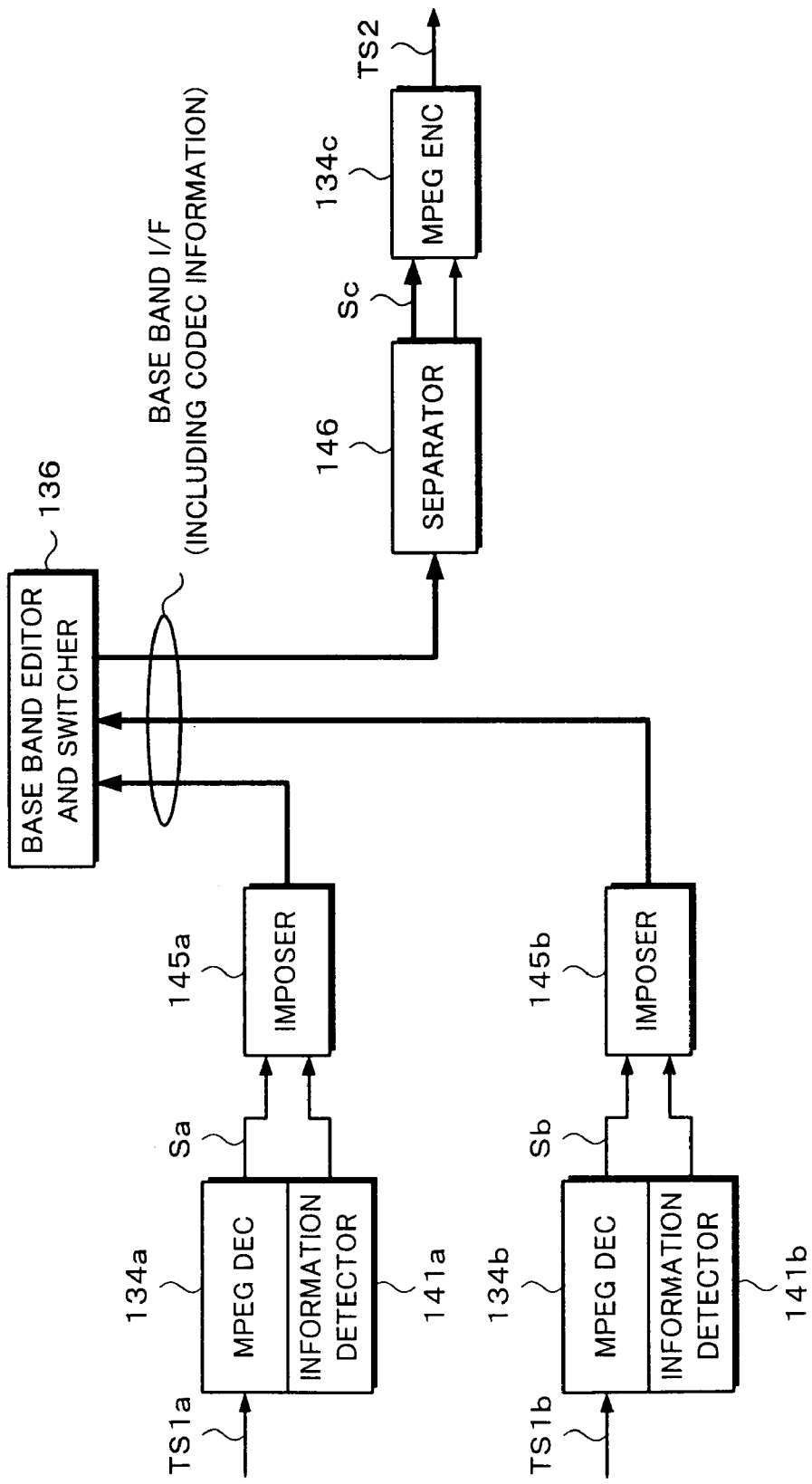
FIG. 23 is a block diagram showing another example of the structure of the editing studio as a reference for explaining the present invention.
Figure 24:
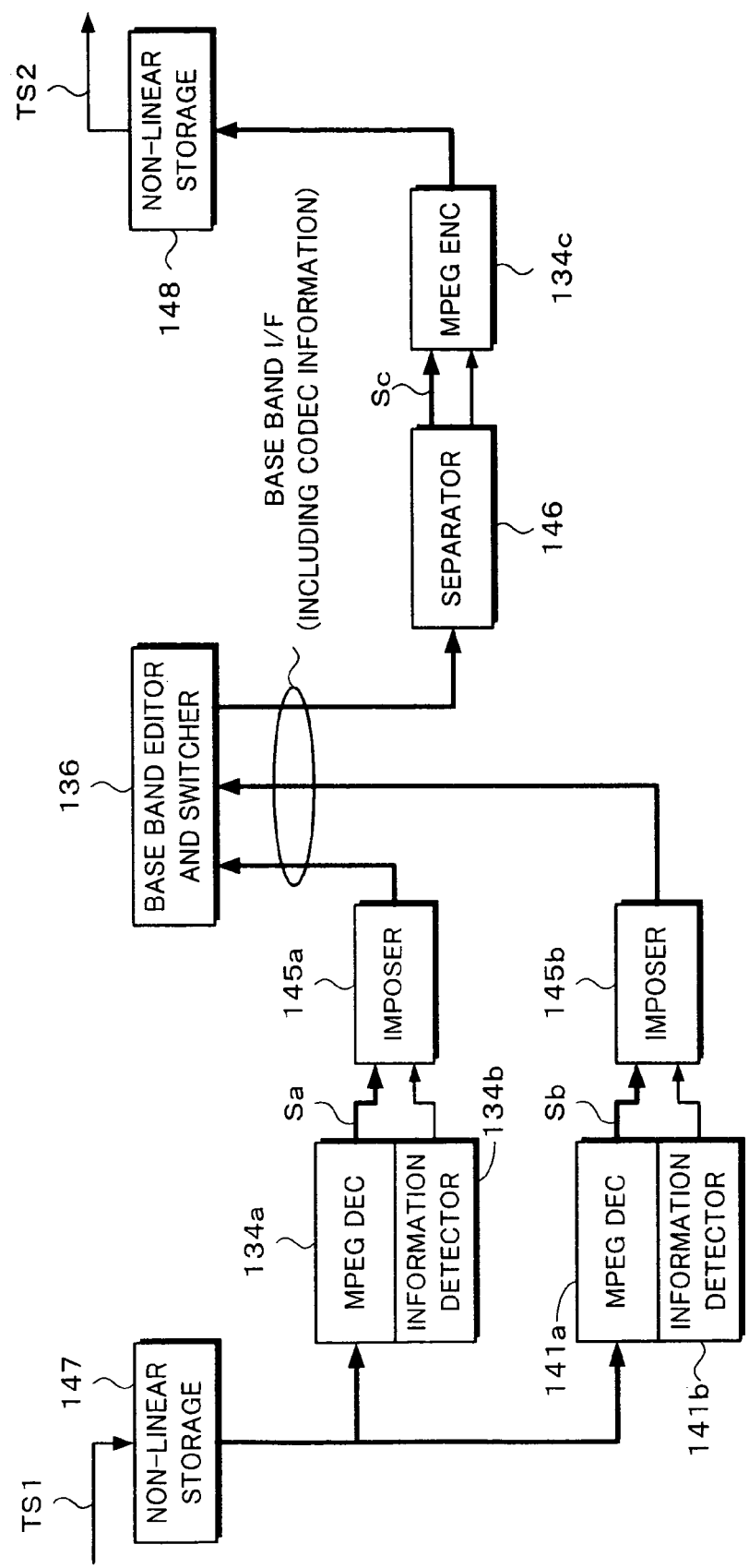
FIG. 24 is a block diagram showing the structure of which a non-linear storage is added to the structure shown in FIG. 23.
Figure 25:
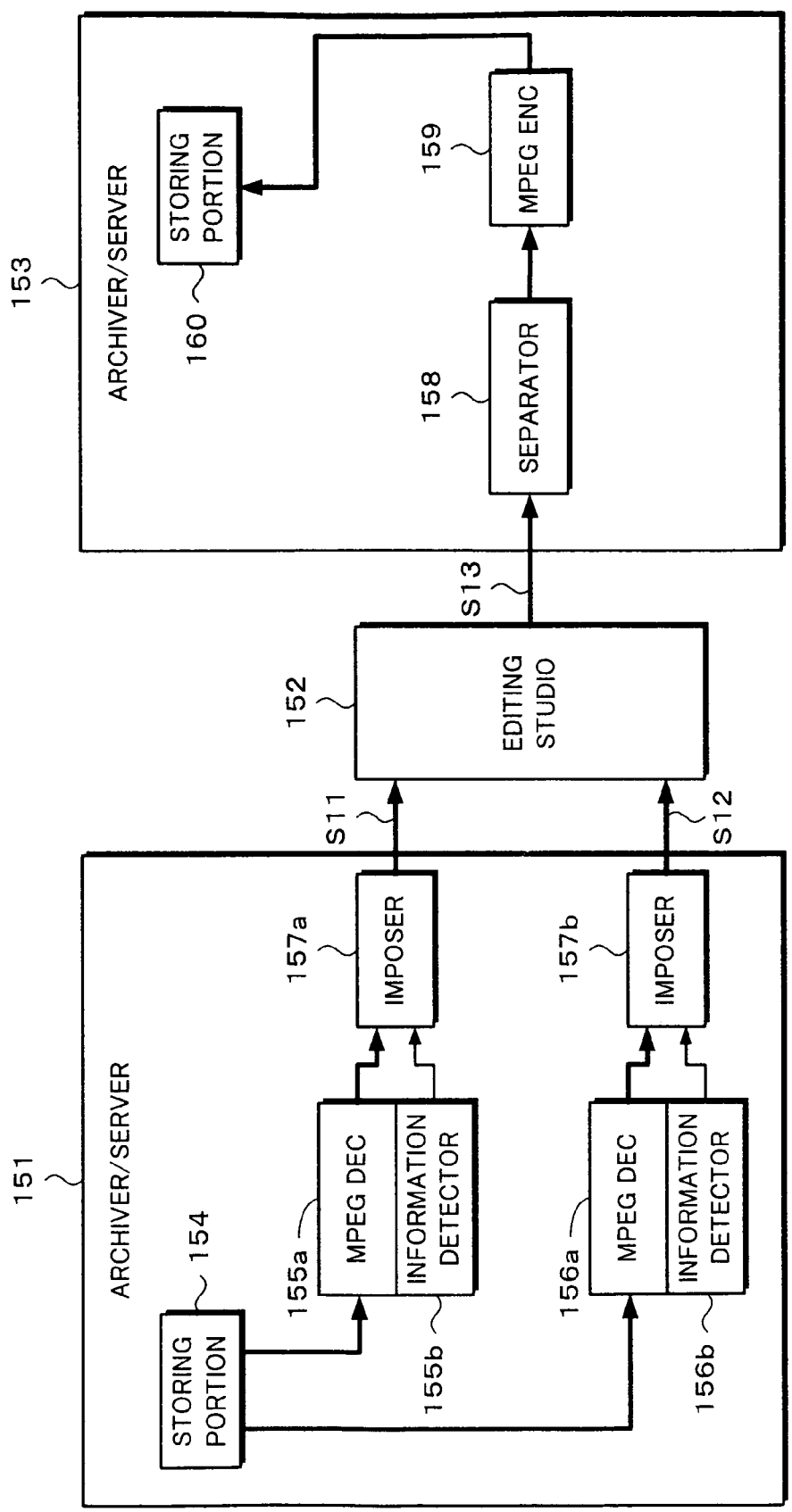
FIG. 25 is a block diagram showing the structure of a system in a broadcasting station as a reference for explaining the present invention.

When frame pictures A and B co-exist as shown in FIG. 14, the determination is performed for each macro block. In the example shown in FIG. 14, frame pictures in the vicinity of an edit point are represented. In the example shown in FIG. 14, the picture type of the considered frame picture is a B picture. In addition, two macro blocks in the forward direction and the backward direction of the edit point are represented. In the frame picture at the edit point, macro blocks MB in the frame picture A are compared with picture blocks equivalent to macro blocks in a past frame picture A at a position moved by a forward moving vector. (In FIG. 14, these macro blocks are denoted by GOOD). In addition, these macro blocks are compared with picture blocks corresponding to macro blocks in a future frame picture B at a position moved by a backward moving vector. In this case, both the blocks do not match the picture blocks (denoted by NG). Thus, in this case, the macro block flag MB Fg is set to "5".

Macro blocks MB in the frame picture B at the edit point are compared with picture blocks equivalent to macro blocks in the frame pictures A and B at positions moved by a forward moving vector and a backward moving vector. As shown in FIG. 14, a macro block matches a macro block in a future frame picture (in this example, a P picture) moved by a backward moving vector. Thus, in this case, the macro block flag MB Fg is set to "6". When the frame pictures A and B do not co-exist, picture blocks equivalent to macro blocks corresponding to a predictive macro block are present in the forward direction and the backward direction of the edit point. Thus, the macro block MB Fg is set to "4".

In FIG. 13, when the determined result at step S33 is Yes (namely, the considered macro block of the frame picture C is a backward macro block), the flow advances to step S41. At step S41, a backward moving vector is prepared. A picture block equivalent to a macro block in a future frame picture A or B at a position moved by a moving vector is searched and detected (at step S42). Thereafter, the flow advances to step S43. At step S43, the detected picture block is compared with the predictive macro block of the considered macro block and determined whether or not a picture block equivalent to a macro block corresponding to the predictive macro block is present.

When the determined result at step S43 is Yes (namely, a picture block equivalent to a macro block corresponding to the predictive macro block is present), the flow advances to step S44. At step S44, the macro flag MB Fg is set to "3". When the determined result at step S43 is No (namely, a picture block equivalent to a macro block corresponding to the predictive macro block is absent), the flow advances to step S39. At step S39, the macro block flag MB Fg is set to "0".

When the determined result at step S33 is No (namely, the considered macro block in the frame picture C is not a backward macro block, but a forward macro block), the flow advances to step S45. At step S45, a forward moving vector is prepared. Thereafter, the flow advances to step S46. At step S46, a picture block equivalent to a macro block in the past frame picture A or B at a position moved by a moving vector is searched and detected. Thereafter, the flow advances to step S47. At step S47, the detected macro block is compared with the predictive macro block of the considered macro block and determined whether or not a picture block equivalent to a macro block corresponding to the predictive macro block is present.

When the determined result at step S47 is Yes (namely, a picture block equivalent to a macro block corresponding to a predictive macro block is present), the flow advances to step S48. At step S48, the macro block flag MB Fg is set to "2". When the determined result at step S47 is No (namely, a picture block equivalent to the relevant macro block is not present), the flow advances to step S39. At step S39, the macro block flag MB Fg is set to "0".

In such a manner, the validity of the re-use of codec information for each macro block is determined. Thus, as shown in FIG. 9, even if two original frame pictures co-exist in a frame picture at an edit point, with codec information for each macro block, the frame picture C can be re-encoded. Thus, codec information can be more finely re-used than the case of the re-encoding process for each frame picture. Consequently, the deterioration of the picture quality can be suppressed.

In the above description, although the MPEG system is used as a compression encoding system, another compression encoding system can be used.

In the editing controlling apparatus according to the present invention, input/output interfaces with the archiver/server and so forth are performed using encoded streams. An interface with an editing device is performed with a base band signal. In addition, with a transcoding process, the deterioration of the picture quality due to a decoding-encoding chain can be remarkably suppressed. Since it is not necessary to add re-encoded information for the transcoding process to a base band signal and to send the resultant signal to an external editing device or a storage device, an editing operation can be performed without affecting the external device. Thus, a material such as a picture material can be stored as a stream. In addition, it is not necessary to change the structure of the editing device in a broadcasting station or a studio. From a stand point of the user, the editing system composed of the editing device and the editing controlling device edits data as a stream. However, the editing system actually edits data as a base band signal.

In addition, a base band signal and a bit stream are correlated. Thus, a transcoding process is performed for only required pictures and switched with relevant bit streams. Consequently, the distortion due to the transcoding process can be remarkably suppressed. Moreover, while a compressed material is directly stored and edited, a base band material is directly stored and edited.

In addition, according to the present invention, since the editing system directly handles an MPEG stream, a multi-channel system can be accomplished for a network circuit disposed in a broadcasting station. Thus, the material transmission resources of the broadcasting station can be effectively used. In consideration of the relation between a center station and local stations for a ground wave broadcast and the relation between a cable operator and head end stations for a CATV system, according to the present invention, a CM of a center station can be substituted with a CM of a local station. In addition, a logo of a broadcasting station can be inserted almost free of deterioration of the resultant bit stream.

In addition, according to the present invention, as described as the second embodiment, when a base band signal decoded from an encoded bit stream is edited and then re-encoded to a stream, it is not necessary to receive edit position information from an editing device. Thus, a transmission line for transmitting the edit position information can be omitted. In addition, a process for interpreting edit information as a time code into a stream on the time base can be omitted.

In addition, according to the present invention as described as the second embodiment, when codec information is re-used for the transcoding process, codec information can be also selected in a smaller data unit than a picture (namely, for each macro block as well as each picture). Thus, even if two or more original materials co-exist in a frame picture at an edit point, the deterioration of the picture quality against the re-encoding process can be suppressed.

The invention claimed is:

1. An editing apparatus, comprising:
 first decoding means for decoding a first encoded bit stream to generate a first base band signal;
 second decoding means for decoding a second encoded bit stream to generate a second base band signal;
 detecting means for matching phases of the first base band signal, the second base band signal, and a third base band signal, and comparing these signals to detect an edit position at which the first base band signal and the second base band signal are connected, the third base band signal being obtained by editing the first base band signal and the second base band signal;
 re-encoding means for re-encoding the third base band signal to generate a third encoded bit stream; and
 controlling means for controlling said re-encoding means to re-use first codec information used to generate the first base band signal and second codec information used to generate the second base band signal corresponding to the edit position detected by said detecting means to re-encode the third base band signal,
 wherein the first and second codec information includes a moving vector, a picture type, a quantizing step size, and a quantizing scale.

2. The editing apparatus as set forth in claim 1, wherein said controlling means controls said re-encoding means to re-encode the third base band signal only in a predetermined period including the edit position detected by said detecting means.

3. The editing apparatus as set forth in claim 1, further comprising:
 selecting means for selecting the third encoded bit stream generated by said re-encoding means in the predetermined period including the edit position and selecting one of the first encoded bit stream and the second encoded bit stream in other than the predetermined period.

4. The editing apparatus as set forth in claim 1, wherein said detecting means matches the phases of the signals of each picture and compares the signals to detect the edit position of each picture.

5. The editing apparatus as set forth in claim 4, wherein said controlling means controls said re-encoding means to selectively re-use the first codec information and the second codec information of each picture corresponding to the edit position of each picture to re-encode the third base band signal.

6. The editing apparatus as set forth in claim 4, wherein said detecting means obtains the difference of pixels in the same spatial position of pictures of the first base band signal and the third base band signal to detect the edit position of each picture.

7. The editing apparatus as set forth in claim 4, wherein said detecting means obtains the difference of pixels in the same spatial position of pictures of the second base band signal and the third base band signal to detect the edit position of each picture.

8. The editing apparatus as set forth in claim 6, wherein said detecting means detects a picture of which the difference of the pixels is not zero as the edit position.

9. The editing apparatus as set forth in claim 7, wherein said detecting means detects a picture of which the difference of the pixels is not zero as the edit position.

10. The editing apparatus as set forth in claim 8, wherein said detecting means detects a picture having a predetermined number of pixels whose difference is not zero as the edit position.

11. The editing apparatus as set forth in claim 9, wherein said detecting means detects a picture having a predetermined number of pixels whose difference is not zero as the edit position.

12. The editing apparatus as set forth in claim 4, wherein when a picture of the first base band signal and a picture of the second base band signal are present at the edit position of each picture, said controlling means controls said re-encoding means to match the phases of the signals of each macro block, compares the signals, and selectively re-uses the first codec information and the second codec information of each macro block to re-encode the third base band signal.

13. The editing apparatus as set forth in claim 4, further comprising:
   determining means for determining the picture type of a picture at the edit position detected by said detecting means,
   wherein said controlling means detects a prediction objective picture at the edit position corresponding to the picture type determined by said determining means to determine whether to re-use the first codec information and the second codec information of each picture.

14. The editing apparatus as set forth in claim 13, wherein when the prediction objective picture is not present in the third base band signal, said control means does not re-use the first codec information and the second codec information.

15. The editing apparatus as set forth in claim 13, further comprising:
   setting means for setting a picture flag that identifies the presence of a prediction objective picture at the edit position corresponding to the picture type determined by said determining means,
   wherein said controlling means references the picture flag that is set by said setting means to determine whether to re-use the first codec information and the second codec information of each picture.

16. The editing apparatus as set forth in claim 12, further comprising:
   determining means for determining the macro block type of a macro block at the edit position detected by said detecting means,
   wherein said controlling means detects a prediction objective macro block at the edit position corresponding to the macro block type determined by said determining means to determine whether to re-use the first codec information and the second codec information of each macro block.

17. The editing apparatus as set forth in claim 16, further comprising:
   setting means for setting a macro block flag that identifies the presence of a prediction objective macro block at the edit position corresponding to the macro block type determined by said determining means,
   wherein said controlling means references the macro block flag that is set by said setting means to determine whether to re-use the first codec information and the second codec information of each macro block.

18. An editing apparatus, comprising:
   first decoding means for decoding a first encoded bit stream to generate a first base band signal;
   second decoding means for decoding a second encoded bit stream to generate a second base band signal;
   detecting means for matching the phases of the first base band signal and a third base band signal and comparing these signals to detect an edit position at which the first base band signal and the second base band signal are connected, the third base band signal being obtained by editing the first base band signal and the second base band signal;
   re-encoding means for re-encoding the third base band signal to generate a third encoded bit stream; and
   controlling means for controlling said re-encoding means to selectively re-use first codec information used to generate the first base band signal and second codec information used to generate the second base band signal corresponding to the edit position detected by said detecting means to re-encode the third base band signal,
   wherein the first and the second codec information includes a moving vector, a picture type, a quantizing step size, and a quantizing scale.

19. An editing apparatus, comprising:
   first decoding means for decoding a first encoded bit stream to generate a first base band signal;
   second decoding means for decoding a second encoded bit stream to generate a second base band signal;
   detecting means for matching the phases of the second base band signal and a third base band signal and comparing these signals to detect an edit position at which the first base band signal and the second base band signal are connected, the third base band signal being obtained by editing the first base band signal and the second base band signal;
   re-encoding means for re-encoding the third base band signal to generate a third encoded bit stream; and
   controlling means for controlling said re-encoding means to selectively re-use first codec information used to generate the first base band signal and second codec information used to generate the second base band signal corresponding to the edit position detected by said detecting means to re-encode the third base band signal,
   wherein the first and the second codec information includes a moving vector, a picture type, a quantizing step size, and a quantizing scale.

20. A re-encoding apparatus, comprising:
   detecting means for matching the phases of a first base band signal, a second base band signal, and a third base band signal and comparing these signals to detect an edit position at which the first base band signal and the second base band signal are connected, the first base band signal being obtained by decoding a first encoded bit stream, the second base band signal being obtained by decoding a second encoded bit stream, the third base band signal being obtained by editing the first base band signal and the second base band signal;
   re-encoding means for re-encoding the third base band signal to generate a third encoded bit stream; and
   controlling means for controlling said re-encoding means to selectively re-use first codec information used to generate the first base band signal and second codec information used to generate the second base band signal corresponding to the edit position detected by said detecting means to re-encode the third base band signal,
   wherein the first and the second codec information includes a moving vector, a picture type, a quantizing step size, and a quantizing scale.

21. A re-encoding apparatus, comprising:
   detecting means for matching the phases of a first base band signal and a third base band signal and comparing these signals to detect an edit position at which the first base band signal and the second base band signal are connected, the first base band signal being obtained by decoding a first encoded bit stream, the third base band signal being obtained by editing the first base band signal and a second base band signal, the second base band signal being obtained by decoding a second encoded bit stream;

re-encoding means for re-encoding the third base band signal to generate a third encoded bit stream; and controlling means for controlling said re-encoding means to selectively re-use first codec information used to generate the first base band signal and second codec information used to generate the second base band signal corresponding to the edit position detected by said detecting means to re-encode the third base band signal, wherein the first and the second codec information includes a moving vector, a picture type, a quantizing step size, and a quantizing scale.

22. A re-encoding apparatus, comprising:

detecting means for matching the phases of a second base band signal and a third base band signal and comparing these signals to detect an edit position at which a first base band signal and the second base band signal are connected, the second base band signal being obtained by decoding a second encoded bit stream, the third base band signal being obtained by editing the first base band signal and the second base band signal, the first base band signal being obtained by decoding a first encoded bit stream;

re-encoding means for re-encoding the third base band signal to generate a third encoded bit stream; and controlling means for controlling said re-encoding means to selectively re-use first codec information used to generate the first base band signal and second codec information used to generate the second base band signal corresponding to the edit position detected by said detecting means to re-encode the third base band signal, wherein the first and the second codec information includes a moving vector, a picture type, a quantizing step size, and a quantizing scale.

23. A re-encoding apparatus, comprising:

re-encoding means for re-encoding a third base band signal to generate a third encoded bit stream, the third base band signal being obtained by editing a first base band signal and a second band signal, the first base band signal being obtained by decoding a first encoded bit stream, the second base band signal being obtained by decoding a second encoded bit stream; and controlling means for controlling said re-encoding means to selectively re-use first codec information used to generate the first base band signal and second codec information used to generate the second base band signal corresponding to an edit position at which the first base band signal and the second base band signal are connected and that is detected by matching the phases of the first base band signal, the second base band signal, and the third base band signal and comparing these signals to re-encode the third base band signal, wherein the first and the second codec information includes a moving vector, a picture type, a quantizing step size, and a quantizing scale.

24. A re-encoding apparatus, comprising:

re-encoding means for re-encoding a third base band signal to generate a third encoded bit stream, the third base band signal being obtained by editing a first base band signal and a second band signal, the first base band signal being obtained by decoding a first encoded bit stream, the second base band signal being obtained by decoding a second encoded bit stream; and controlling means for controlling said re-encoding means to selectively re-use first codec information used to generate the first base band signal and second codec information used to generate the second base band signal corresponding to an edit position at which the first base band signal and the second base band signal are connected and that is detected by matching the phases of the first base band signal and the third base band signal and comparing these signals to re-encode the third base band signal, wherein the codec information includes a moving vector, a picture type, a quantizing step size, and a quantizing scale.

25. A re-encoding apparatus, comprising:

re-encoding means for re-encoding a third base band signal to generate a third encoded bit stream, the third base band signal being obtained by editing a first base band signal and a second band signal, the first base band signal being obtained by decoding a first encoded bit stream, the second base band signal being obtained by decoding a second encoded bit stream; and controlling means for controlling said re-encoding means to selectively re-use first codec information used to generate the first base band signal and second codec information used to generate the second base band signal corresponding to an edit position at which the first base band signal and the second base band signal are connected and that is detected by matching the phases of the second base band signal and the third base band signal and comparing these signals to re-encode the third base band signal, wherein the codec information includes a moving vector, a picture type, a quantizing step size, and a quantizing scale.

26. An editing method, comprising the steps of:

decoding a first encoded bit stream to generate a first base band signal;

decoding a second encoded bit stream to generate a second base band signal;

matching the phases of the first base band signal, the second base band signal, and a third base band signal, and comparing these signals to detect an edit position at which the first base band signal and the second base band signal are connected, the third base band signal being obtained by editing the first base band signal and the second base band signal;

re-encoding the third base band signal to generate a third encoded bit stream; and controlling the re-encoding step to selectively re-use first codec information used to generate the first base band signal and second codec information used to generate the second base band signal corresponding to the edit position detected at the detecting step to re-encode the third base band signal, wherein the first and the second codec information includes a moving vector, a picture type, a quantizing step size, and a quantizing scale.

27. An editing method, comprising the steps of:

decoding a first encoded bit stream to generate a first base band signal;

decoding a second encoded bit stream to generate a second base band signal;

matching the phases of the first base band signal and a third base band signal and comparing these signals to detect an edit position at which the first base band signal and a second base band signal are connected, the third base band signal being obtained by editing the first base band signal and the second base band signal;

re-encoding the third base band signal to generate a third encoded bit stream; and controlling the re-encoding step to selectively re-use first codec information used to generate the first base band signal and second codec information used to generate the second base band signal corresponding to the edit position detected at the detecting step to re-encode the third base band signal, wherein the first and the second codec information includes a moving vector, a picture type, a quantizing step size, and a quantizing scale.

28. An editing method, comprising the steps of:

decoding a first encoded bit stream to generate a first base band signal;

decoding a second encoded bit stream to generate a second base band signal;

matching the phases of the second base band signal and a third base band signal and comparing these signals to detect an edit position at which the first base band signal and a second base band signal are connected, the third base band signal being obtained by editing the first base band signal and the second base band signal;

re-encoding the third base band signal to generate a third encoded bit stream; and controlling the re-encoding step to selectively re-use first codec information used to generate the first base band signal and second codec information used to generate the second base band signal corresponding to the edit position detected at the detecting step to re-encode the third base band signal, wherein the first and the second codec information includes a moving vector, a picture type, a quantizing step size, and a quantizing scale.

29. A re-encoding method, comprising the steps of:

matching the phases of a first base band signal and a third base band signal and comparing these signals to detect an edit position at which the first base band signal and the second base band signal are connected, the first base band signal being obtained by decoding a first encoded bit stream, the third base band signal being obtained by editing the first base band signal and a second base band signal, the second base band signal being obtained by decoding a second encoded bit stream;

re-encoding the third base band signal to generate a third encoded bit stream; and controlling the re-encoding step to selectively re-use first codec information used to generate the first base band signal and second codec information used to generate the second base band signal corresponding to the edit position detected at the detecting step to re-encode the third base band signal, wherein the first and the second codec information includes a moving vector, a picture type, a quantizing step size, and a quantizing scale.

30. A re-encoding method, comprising the steps of:

matching the phases of a second base band signal and a third base band signal and comparing these signals to detect an edit position at which a first base band signal and the second base band signal are connected, the second base band signal being obtained by decoding a second encoded bit stream, the third base band signal being obtained by editing the first base band signal and the second base band signal, the first base band signal being obtained by decoding a first encoded bit stream;

re-encoding the third base band signal to generate a third encoded bit stream; and controlling the re-encoding step to selectively re-use first codec information used to generate the first base band signal and second codec information used to generate the second base band signal corresponding to the edit position detected at the detecting step to re-encode the third base band signal, wherein the first and the second codec information includes a moving vector, a picture type, a quantizing step size, and a quantizing scale.

31. A re-encoding method, comprising the steps of:

matching the phases of a first base band signal, a second base band signal, and a third base band signal and comparing these signals to detect an edit position at which the first base band signal and the second base band signal are connected, the first base band signal being obtained by decoding a first encoded bit stream, the second base band signal being obtained by decoding the second encoded bit stream, the third base band signal being obtained by editing the first base band signal and the second base band signal;

re-encoding the third base band signal to generate a third encoded bit stream; and controlling the re-encoding step to selectively re-use first codec information used to generate the first base band signal and second codec information used to generate the second base band signal corresponding to the edit position detected at the detecting step to re-encode the third base band signal, wherein the first and the second codec information includes a moving vector, a picture type, a quantizing step size, and a quantizing scale.

32. A re-encoding method, comprising the steps of:

re-encoding a third base band signal to generate a third encoded bit stream, the third base band signal being obtained by editing a first base band signal and a second band signal, the first base band signal being obtained by decoding a first encoded bit stream, the second base band signal being obtained by decoding a second encoded bit stream; and controlling the re-encoding step to selectively re-use first codec information used to generate the first base band signal and second codec information used to generate the second base band signal corresponding to an edit position at which the first base band signal and the second base band signal are connected and that is detected by matching the phases of the first base band signal and the third base band signal and comparing these signals to re-encode the third base band signal, wherein the first and the second codec information includes a moving vector, a picture type, a quantizing step size, and a quantizing scale.

33. A re-encoding method, comprising the steps of:

re-encoding a third base band signal to generate a third encoded bit stream, the third base band signal being obtained by editing a first base band signal and a second base band signal, the first base band signal being obtained by decoding a first encoded bit stream, the second base band signal being obtained by decoding a second encoded bit stream; and controlling the re-encoding step to selectively re-use first codec information used to generate the first base band signal and second codec information used to generate the second base band signal corresponding to an edit position at which the first base band signal and the second base band signal are connected and that is detected by matching the phases of the second base band signal and the third base band signal and comparing these signals to re-encode the third base band signal, wherein the first and the second codec information includes a moving vector, a picture type, a quantizing step size, and a quantizing scale.

34. A re-encoding method, comprising the steps of:

re-encoding a third base band signal to generate a third encoded bit stream, the third base band signal being obtained by editing a first base band signal and a second band signal, the first base band signal being obtained by decoding a first encoded bit stream, the second base band signal being obtained by decoding a second encoded bit stream; and controlling the re-encoding step to selectively re-use first codec information used to generate the first base band signal and second codec information used to generate the second base band signal corresponding to an edit position at which the first base band signal and the second base band signal are connected and that is detected by matching the phases of the first base band signal, the second base band signal, and the third base band signal and comparing these signals to re-encode the third base band signal, wherein the first and the second codec information includes a moving vector, a picture type, a quantizing step size, and a quantizing scale.

* * * * *